US007996192B2

(12) United States Patent
Repelli et al.

(10) Patent No.: US 7,996,192 B2
(45) Date of Patent: Aug. 9, 2011

(54) METHOD AND APPARATUS FOR GENERATING AN ENVIRONMENTAL ELEMENT PREDICTION FOR A POINT OF INTEREST

(75) Inventors: Carlos Repelli, Austin, TX (US); Rodrigo Zerlotti, Austin, TX (US)

(73) Assignee: DBLive Corporation, Austin, TX (US)

( * ) Notice: Subject to any disclaimer, the term of this patent is extended or adjusted under 35 U.S.C. 154(b) by 1162 days.

(21) Appl. No.: 11/140,485

(22) Filed: May 28, 2005

(65) Prior Publication Data
US 2006/0271297 A1 Nov. 30, 2006

(51) Int. Cl.
*G06F 17/50* (2006.01)
*G01W 1/04* (2006.01)

(52) U.S. Cl. ................................. 703/2; 703/6; 340/601

(58) Field of Classification Search .................. 703/2, 6, 703/18; 345/419; 250/339.04; 702/3; 340/601
See application file for complete search history.

(56) References Cited

U.S. PATENT DOCUMENTS

| | | | |
|---|---|---|---|
| 4,962,522 A | 10/1990 | Marian | |
| 5,208,855 A | 5/1993 | Marian | |
| 5,281,815 A * | 1/1994 | Even-Tov | 250/339.04 |
| 5,583,972 A * | 12/1996 | Miller | 345/419 |
| 5,696,671 A | 12/1997 | Oliver | |
| 5,751,289 A * | 5/1998 | Myers | 345/419 |
| 5,870,302 A | 2/1999 | Oliver | |
| 6,031,455 A | 2/2000 | Grube et al. | |
| 6,154,143 A * | 11/2000 | Robinson | 340/601 |
| 6,266,063 B1 * | 7/2001 | Baron et al. | 345/419 |
| 6,297,766 B1 * | 10/2001 | Koeller | 342/357.06 |
| 6,356,843 B1 * | 3/2002 | Baron et al. | 702/3 |
| 6,384,830 B2 * | 5/2002 | Baron et al. | 345/473 |
| 6,477,468 B1 * | 11/2002 | Dahlke | 702/3 |
| 6,498,987 B1 | 12/2002 | Wilt et al. | |
| 6,590,529 B2 * | 7/2003 | Schwoegler | 342/357.13 |
| 6,646,559 B2 | 11/2003 | Smith | |
| 6,654,689 B1 * | 11/2003 | Kelly et al. | 702/3 |
| 6,823,263 B1 | 11/2004 | Kelly et al. | |
| 6,829,536 B2 | 12/2004 | Moore | |
| 6,842,737 B1 | 1/2005 | Stiles et al. | |
| 6,845,324 B2 | 1/2005 | Smith | |
| 6,895,310 B1 | 5/2005 | Kolls | |
| 7,191,064 B1 * | 3/2007 | Myers et al. | 702/3 |
| 7,725,256 B2 * | 5/2010 | Marsh | 701/213 |
| 2005/0119797 A1 | 6/2005 | Marian | |
| 2005/0143842 A1 | 6/2005 | Marian | |

(Continued)

FOREIGN PATENT DOCUMENTS

KR 10-2004-0090044 A 10/2004

OTHER PUBLICATIONS

"Performance Evaluation of WeatherTRAK Irrigation Controllers in Colorado," AquaCraft, Inc., Boulder, Colorado (2001).

(Continued)

*Primary Examiner* — Thai Phan
(74) *Attorney, Agent, or Firm* — Davis & Associates; William D. Davis

(57) ABSTRACT

An apparatus for generating environmental element predictions at a point location includes a receiver for collecting broadcast environmental element prediction data. A processor generates at least one environmental element prediction for the point location.

10 Claims, 23 Drawing Sheets

U.S. PATENT DOCUMENTS

2005/0187666 A1    8/2005    Marian

OTHER PUBLICATIONS

Siegel, Lee, "Gardening from Orbit: Satellite-Controlled Lawn Sprinklers to Save Water," SPACE.Com, Imaginova Corp., New York, New York (Aug. 16, 2000).

"Water & Irrigation Control Solutions: Radio Piccolo XR—A New Remote Terminal Unit for the IRRInet System," Motorola, Inc., Schaumburg, Illinois (2002).

WeatherTrak ET Everywhere Data Service, Hydropoint Data Systems, Inc., Petaluma, California (2003).

Look Ahead ET Control Service Brochure, Water2Save, LLC, Solana Beach, California (2003).

"Weather Based Technologies for Residential Irrigation Scheduling" *Reclamation: Managing Water in the West*, U.S. Department of the Interior, Bureau of Reclamation, Lower Colorado Region, Southern California Area Office (May 2004).

"Irrigation Equipment," *California Fairways*, reprint by Highbeam Research, Inc., Chicago, Illinois (Nov. 1, 2004).

"Intelli-Sense Series Residential/Commercial Controllers," The Toro Company, Riverside, California (Jan. 2005).

"Hydropoint Launches WeatherTRAK ET Pro Commercial Irrigation Management Solution," ThomasNet.com Thomas Industrial Nework, Inc., New York, New York (Feb. 17, 2005).

"Hybrid Smart Dial Series: ET-Based Controllers," Irritrol Systems, Riverside, California (Mar. 2005).

"Report on Performance of ET Based Irrigation Controller: Analysis of Operation of WeatherTRAK Controller in Field Conditions During 2002," Aquacraft, Inc. Boulder, Colorado (Aug. 23, 2003).

Hunt, Theodore, et al., "Residential Weather-Based Irrigation Scheduling: Evidence from the Irvine 'ET Controller' Study, " Irvine Ranch Water District, Irvine, California (Jun. 2001).

"Eligible Weather-Based Irrigation Controllers, Commercial/Multi-Family", Smart Landscape Program, San Diego County Water Authority, San Deigo, California (Mar. 28, 2005).

Bamezai, Anil, "LADWP Weather-Based Irrigation Controller Pilot Study," Los Angeles Department of Water and Power, Los Angeles, California (Aug. 3, 2004).

Ash, Tom, "How to Implement a Cost-effective Landscape Water Efficiency Program," Hydropoint Data Systems, Inc., Petaluma, California (2005).

Lorenc, Andrew C., "Atmospheric Data Assimilation", United Kingdom Meteorological Office, Forecasting Research Division (England), Scientific Paper No. 34, (May 1995).

Ren, M. J.; et al. "Predictive Optimal Control of Fabric Thermal Storage Systems", Proceedings of the 5th International Building Performance Simulation Association, Prague, Czech Republic, (1997).

Juan S. Senent; et al., "MIMO Predictive Control of Temperature and Humidity Inside a Greenhouse Using Simulated Annealing (SA) as Optimizer of a Multicriteria Index", 11th International Conference on Industrial and Engineering Applications of Artificial Intelligence and Expert Systems, IEA/AIE-98, Castellón, Spain, Jun. 1-4, 1998.

Lee, Jin-Young; et al., "A Study of the Predictive Control of the ONDOL System in Apartments," Proceedings of Building Simulation '99, vol. 1:214-222 (1999).

Macpherson, B., "The Meteorological Office mesoscale data assimilation scheme", United Kingdom Meteorological Office, Forecasting Research Division (England) (2000).

"U.S. Government selects massive IBM supercomputer for the nation's weather forecasts", IBM Press Release (May 2002).

Dukes, Michael D.; et al., "Residential Irrigation System Rainfall Shutoff Devices", ABE 325 Agricultural and Biological Engineering Department, Florida Cooperative Extension Service, Institute of Food and Agricultural Services, University of Florida (Jul. 2002).

Irrigation Controllers—Timers for the Homeowner, East Bay Municipal Utility District of Oakland California, published by United States Environmental Protection Agency, EPA-832-K-03-001 (Jul. 2003).

"irriGuard", Home Toys (Oct. 2004).

\* cited by examiner

OBSERVATION SITE: RZ1
LOCATION: 30.1° -98.1° 28 FT

1010

| DATE | OBSERVED | MAXIMUM TEMPERATURE |||||
|---|---|---|---|---|---|---|
| | | LAGGING PREDICTED VALUE |||||
| | | 0 DAY | 1 DAY | 2 DAY | ••• | N-DAY |
| 05/07/2005 | 80° | 79° | 77° | 78° ~1014 | | 81° |
| 05/06/2005 | 84° | 85° | 82° | 83° | | 84° |
| 05/05/2005 | 85° | 83° | 86° | 85° | | 84° |
| 05/04/2005 | 88° | 87° | 89° | 88° | ••• | 86° |
| ⋮ | ⋮ | | | ⋮ | | |
| 05/02/2005 | 87° | 86° | 84° | 89° | | 88° |

1012

1050

| DATE | OBSERVED | MAXIMUM TEMPERATURE |||||
|---|---|---|---|---|---|---|
| | | ERROR |||||
| | | 0 DAY | 1 DAY | 2 DAY | ••• | N-DAY |
| 05/07/2005 | 80° | 1° | 3° | 2° | | -1° |
| 05/06/2005 | 84° | -1° | 2° | 1° | | 0° |
| 05/05/2005 | 85° | 2° | -1° | 0° | | 1° |
| 05/04/2005 | 88° | 1° | -1° | 0° | ••• | 2° |
| ⋮ | ⋮ | | | ⋮ | | |
| 05/02/2005 | 87° | 1° | 3° | -2° | | -1° |

↑ 1052   ↑ 1054   ↑ 1056   ↑ 1058

METHOD AND APPARATUS FOR GENERATING AN ENVIRONMENTAL ELEMENT PREDICTION FOR A POINT OF INTEREST

TECHNICAL FIELD

This invention relates to the field of forecasting environmental conditions. In particular, this invention is drawn to the generation and use of environmental element predictions for a point location.

BACKGROUND

Environmental conditions for a location or region can be described with various environmental elements and their associated value. The value of a given set of such environmental elements defines the environmental state of interest for the location or region. Accurate predictions of an environmental state are useful for planning a wide range of activities for any number of entities including government, military, consumer, and other commercial enterprises. Groups of environmental elements are frequently categorized for convenience into classifications such as meteorological, marine, hydrological, etc.

Meteorological elements reflect a subset of environmental elements that describe the physical and dynamic behavior of the atmosphere. Weather is a description of short-term atmospheric behavior. Weather predictions might be useful, for example, to determine when to travel, a transportation route, or a mode of transportation. Longer-term atmospheric behavior is generally referred to as climate and falls within the field of climatology. Climate prediction is useful for longer term planning such as determining which crops to plant. Global models have been developed to aid in studying and forecasting some environmental elements, particularly meteorological elements and those environmental elements pertaining to the determination of the meteorological elements (e.g., hydrological elements).

Generating a global weather forecast requires tremendous computational power. Typically, government-sponsored organizations develop global weather models, collect and maintain data for the models, and run the models to generate predictions about the weather in a process referred to as numerical weather prediction. Government sponsorship is prevalent due to the capital-intensive nature of the computational resources involved, the volume and source of the data required, and the benefits afforded on a societal scale.

Numerical weather prediction involves numerically integrating a set of differential equations. This is accomplished by dividing the spatially relevant portion of the atmosphere into a finite number of three dimensional grid elements and performing a time-series finite element analysis. Due to the time constraints and the computational resources available, the forecast is typically a synoptic scale forecast having a spatial resolution on the order of a hundred or more kilometers latitudinally and longitudinally.

The global weather model becomes the starting point for determining a weather forecast on a finer spatial resolution. For example, local weather prediction is often handled by human meteorologists local to the region at issue who rely on numerical weather predictions, observation, history, and their own experience for generating a regional weather forecast. The forecast generated by the meteorologist usually covers a relatively large region (e.g., city-wide, country-wide, etc.) and is typically designated for local landmarks (e.g., downtown, airport, stadium, etc.).

One disadvantage of this approach is that a skilled professional is required. The skilled professional typically only address regions near populous areas, significant landmarks, or observation stations.

Another disadvantage of this approach is that the results are expressed for the entire region even though the weather condition may vary greatly from one location to another within the region. Temperatures at an airport or a city center, for example, may be extraordinarily elevated when compared with temperatures near a lake within the same region. Thus the regional forecasting approach does not address the anticipated fluctuation in weather that may occur from point to point within the same region.

SUMMARY

In view of limitations of known systems and methods, various methods and apparatus for generating point environmental element predictions are described. In one embodiment, an apparatus for generating environmental element predictions at a point location includes a receiver collecting broadcast environmental element prediction data. A processor generates at least one environmental element prediction for the point location.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Environmental elements may also alternatively be referred to as environmental variables, parameters, or conditions and generally describe a physical characteristic or attribute of the environment about a given location. Knowledge of the conditions or values for these elements is important to determine whether and to what extent the existence or development of someone or something will be affected. These environmental elements are frequently categorized into groups for ease of use, however, one element may be in more than one category. "Meteorological" is one such category of environmental elements. Meteorological elements will frequently be utilized for purposes of example.

The envelope of air surrounding the Earth and bound to the Earth by gravity is referred to as the atmosphere. The structure, properties, and physical processes of the atmosphere are the subject matter of the field of meteorology.

The term "climate" is generally used to refer to long-term atmospheric behavior. "Weather" reflects the short-term state of the atmosphere, particularly those characteristics that tend to affect human activity. Weather, generally refers to variations of the atmospheric state over periods of a few minutes to a few weeks.

Figure 1:
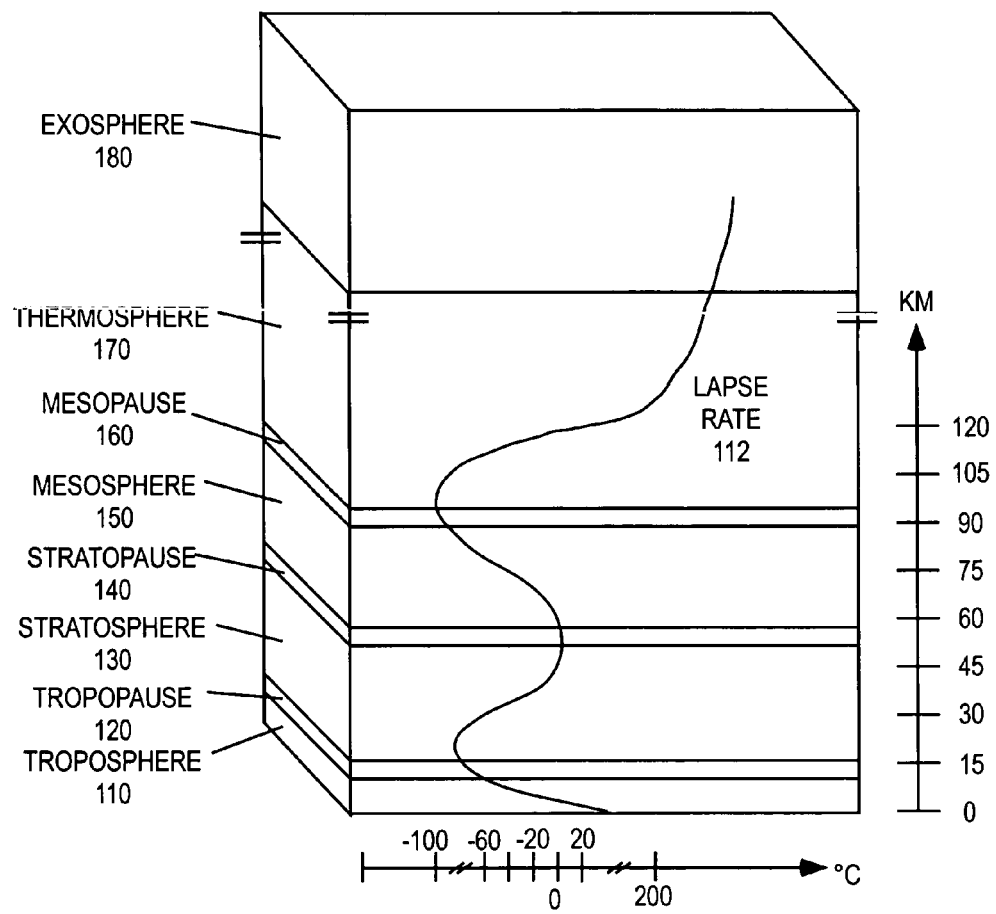
FIG. 1 illustrates the layers of the atmosphere.

FIG. 1 illustrates various layers of the atmosphere. The layer closest to the Earth is referred to as the troposphere 110. The troposphere extends from the surface of the Earth to approximately 8-15 km. The tropopause 120 separates the troposphere from the stratosphere. The stratosphere 130 extends to approximately 50 km before the stratopause 140 is encountered. The stratopause is followed by the mesosphere 150 that extends to approximately 85 km. The mesosphere is followed by the mesopause 160. Following the mesopause, the thermosphere 170 extends up to 600 km. The thermosphere is followed by the exosphere 180. Each of these layers has distinct physical and chemical properties. Weather is dictated predominately by the state of the troposphere 110.

The weather at a particular place and time may be characterized by a number of meteorological elements. The elements might include, for example: air temperature, pressure, wind speed, wind direction, probability and amount of precipitation, humidity, cloud cover, and visibility.

Figure 2:
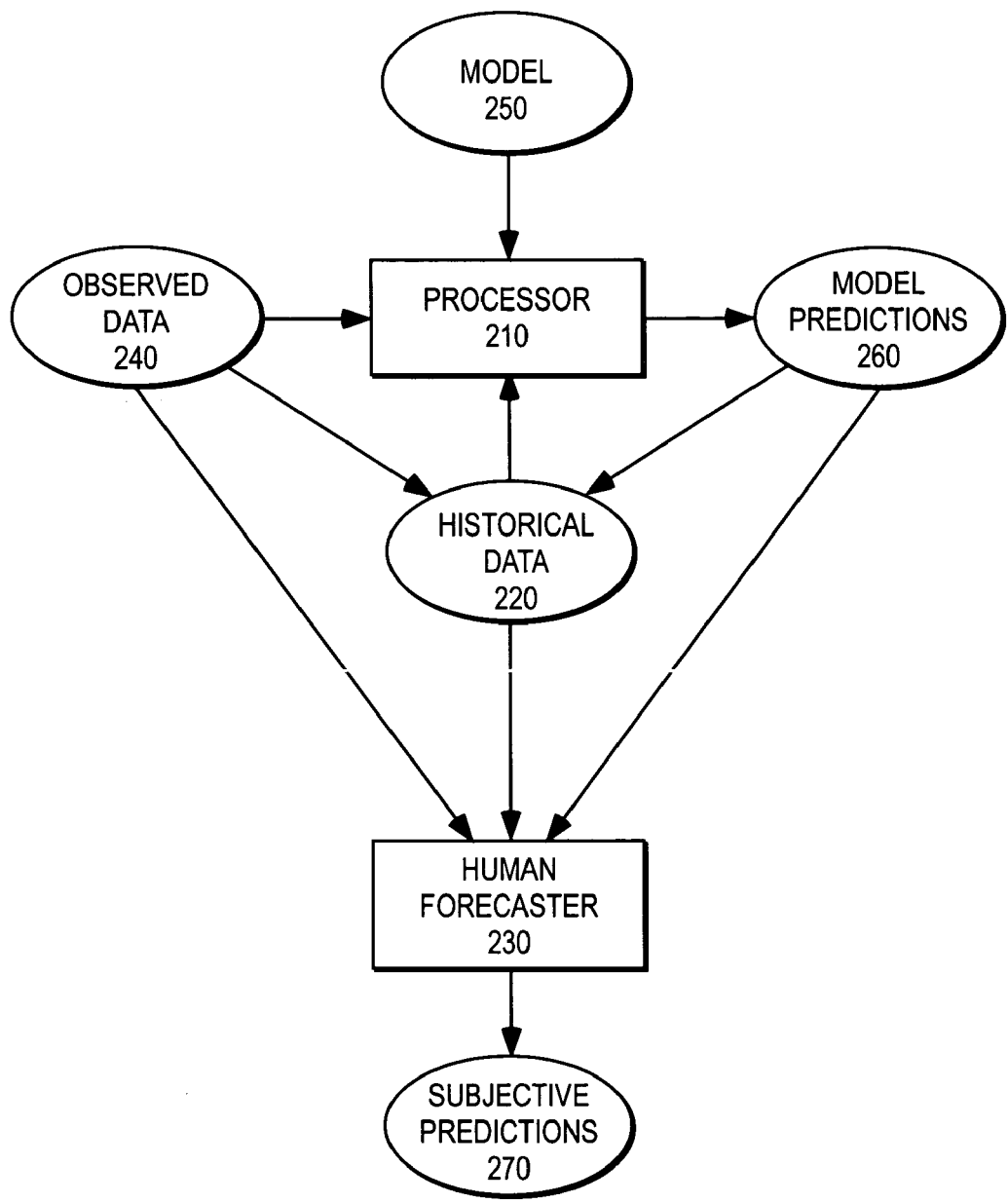
FIG. 2 illustrates numerical weather prediction incorporating a human forecaster.

FIG. 2 illustrates one embodiment of a numerical weather prediction (NWP) process incorporating a human forecaster. A model 250 representing the atmosphere is provided to processor 210. Observed data 240 and historical data 220 serve to establish the initial conditions for the model. The observed data is also recorded into the historical data for future use. Processor 210 solves the aforementioned equations to calculate future states of the atmosphere as model predictions 260. The model predictions are also typically recorded as historical data for testing the validity of the model.

A human forecaster 230 (i.e., meteorological expert familiar with the local area of interest) interprets the model predictions 260, observed data 240, and the historical data 220 to generate an inevitably subjective prediction 270. The human forecaster plays an integral role in revising the model predictions to create subjective predictions that incorporate the forecaster's personal experience or familiarity with regional weather behavior.

Figure 3:
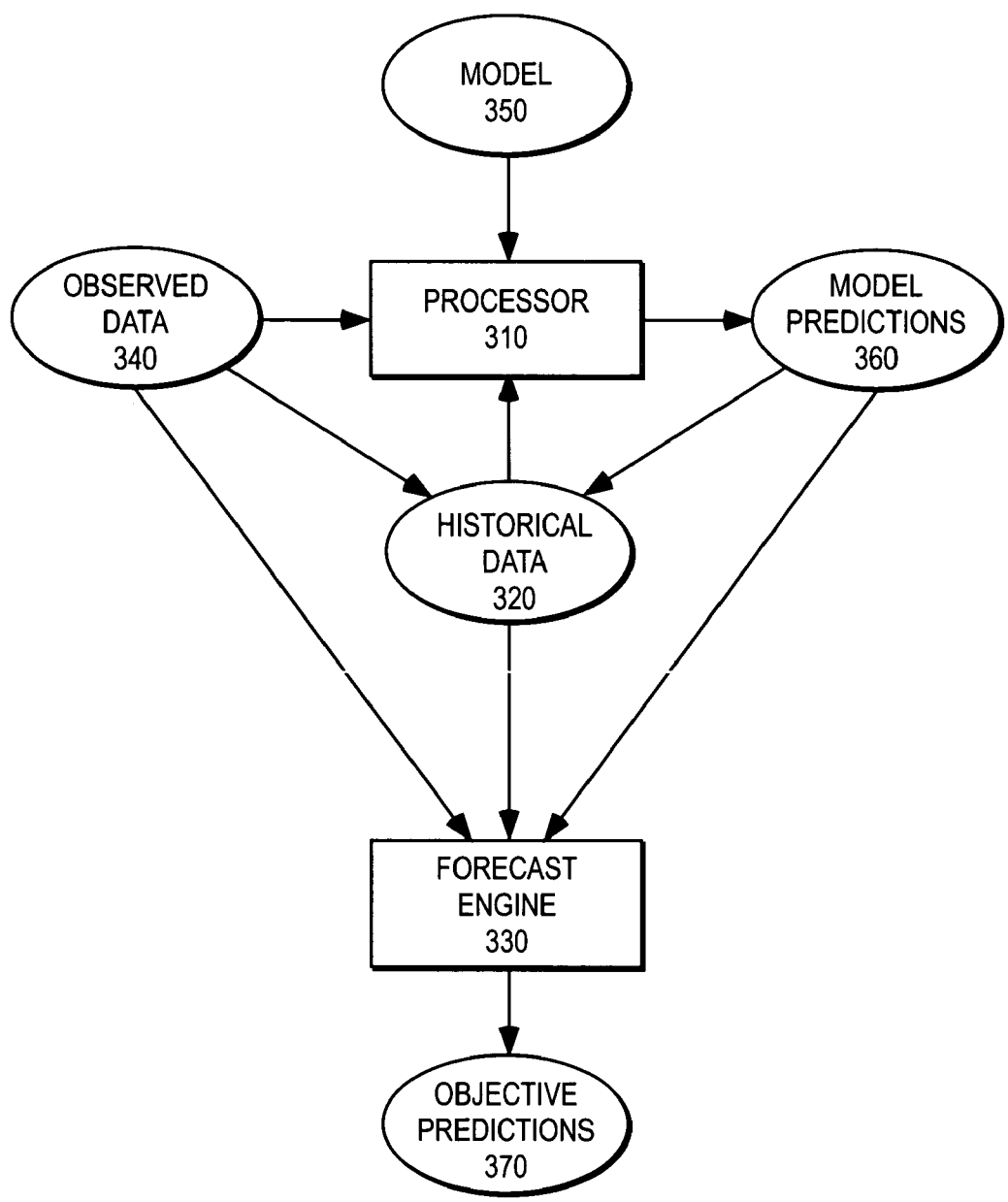
FIG. 3 illustrates numerical weather prediction incorporating a forecast engine.

An improved NWP process incorporates a forecast engine rather than a human forecaster. FIG. 3 illustrates one embodiment of a NWP process incorporating such a forecast engine. As with FIG. 2, the model 350 representing the atmosphere is provided to processor 310. Observed data 340 and historical data 320 serve to establish the initial conditions for the model. The observed data is also recorded into the historical data for future use. Processor 310 solves the aforementioned equations to calculate future states of the atmosphere as model predictions 360. The model predictions are also recorded as historical data for testing the validity of the model.

In contrast with FIG. 2, a forecast engine 330 is used to generate objective predictions 370 from the observed data 340, historical data 320, and model predictions 360. Although FIG. 3 is drawn to numerical weather prediction, such a forecast engine can likewise be used to provide environmental element predictions without the human forecaster.

Various aspects of a forecast engine including forecasting processes, system architectural implementations (e.g., client-server, broadcast, etc.), physical implementation (e.g., client computer application, stand-alone device, etc.) as well as practical applications (e.g., irrigation control) are described below.

Numerical weather prediction relies upon a meteorological model of the atmosphere to approximate the behavior of the atmosphere over time. Several models for NWP are available. The models typically divide the spatially relevant portion of the atmosphere into a finite number of grid elements.

The NWP model incorporates equations from fluid dynamics including equations of motion, thermodynamic and moisture equations, and the continuity equation for conservation of mass for each grid element. The equations are then solved in time steps to calculate future states of the atmosphere as a regular grid of meteorological element prediction data. Initial conditions for the grid points are established by interpolation from meteorological element data observed and reported from various observation points. The solution to the aforementioned equations is iteratively derived using the interpolated observed meteorological element data for the initial conditions. The model may be run several times a day as the observations are updated.

Figure 4:
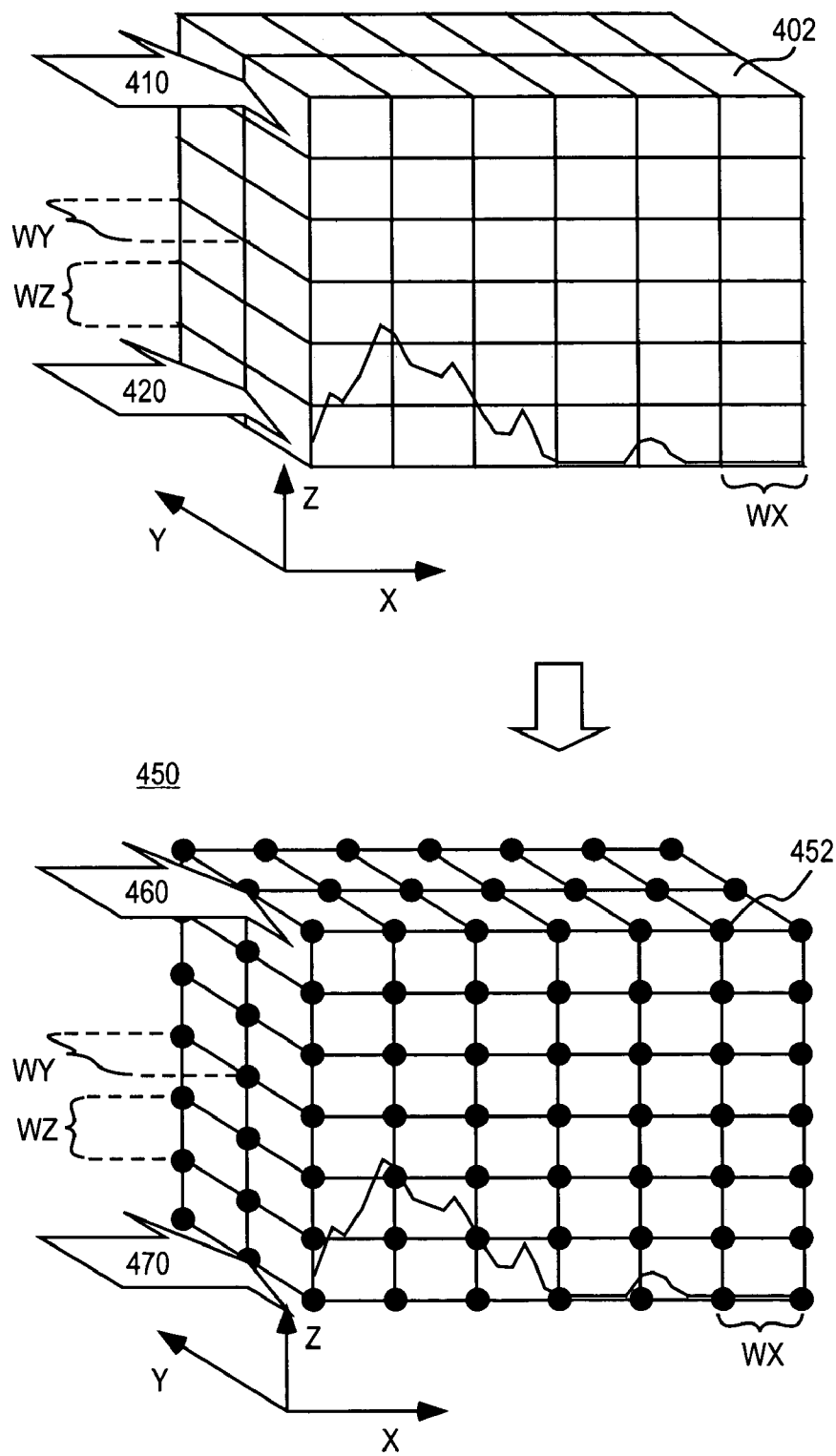
FIG. 4 illustrates three-dimensional grid elements of a layered global weather model.

FIG. 4 illustrates a portion of the atmosphere partitioned into a plurality of layers of brick-shaped grid elements. Each grid element 402 has an associated X, Y, Z co-ordinate. Thus, the troposphere may be subdivided into additional layers 410-420 of grid elements for NWP. The result of NWP can be described as an array of one or more meteorological elements such as temperature, humidity, pressure, etc. for each grid point associated with a grid element. Each array is associated with a specific time or time step and a specific X, Y, Z co-ordinate location. The term "prediction" may include future timeframes and the current timeframe (i.e., time step or timeframe 0).

Layers 410-420 of grid elements 402 become layers 460-470 of grid points 452. The distance between the grid points is referred to as the grid length. The grid length is representative of spatial resolution. Vertical levels determine the vertical resolution of the model. The result of NWP is thus a three-dimensional grid of points 452 each of which is associated with an array of meteorological elements at a specific time or time step. The points are referred to as a grid points. The information (e.g., location, environmental element prediction data) associated with one or more such points is collectively referred to as grid data.

The size of the grid elements determines the spatial resolution of the NWP. Dimensions measured about the surface of the earth (i.e., same radius) are referred to as horizontal. The horizontal grid length WX may be distinct from the horizontal grid length WY. Dimensions measured perpendicular to the surface of the earth are referred to as vertical or layer. The grid element height is WZ and defines the vertical resolution for the model.

Due to the time constraints (the prediction must be available before the targeted time frame for practical use) and the computational resources available, the prediction is typically a synoptic scale prediction with each grid element having a spatial resolution on the order of hundreds of kilometers ($1°\times1°$) for a global model or around 20 km by 20 km for a regional model. A NWP model utilizing 10-40 vertical layers is not unrealistic. The computational power required to perform global predictions with so many elements is significant. Generally only very powerful supercomputers are capable of performing this task within the timeframe limitations.

Collectively, the grid elements can provide information about weather phenomena operating across areas that span multiple grid elements. NWP cannot resolve meteorological element details within an individual grid element. At best, aggregate inferences may be made about the meteorological elements within the grid elements.

Several meteorological models are available for predicting the weather. Examples include North American Mesoscale and variants (NAM, NAM-NMM, NAM-WRF, ETA), Global Forecast System (GFS), Rapid Update Cycle (RUC), Air Force Weather Agency Mesoscale Model version 5 (AFWA/MM5), Navy Operational Global Atmospheric Prediction System (NOGAPS), Coupled Ocean/Atmosphere Mesoscale Prediction System (COAMPS), and Global Environmental Multiscale (GEM). Some additional global models include Medium Range Forecast (MRF), and Aviation Model Forecast (AVN). Regional models include the ETA model, Regional Atmospheric Modeling System (RAMS), and Mesoscale Model 5 (MM5).

The models may be differentiated on a number of factors including the organization or entity managing and operating the model, the scale (regional, mesoscale, global), model structure (e.g., number of vertical layers, horizontal resolution, etc.), model physics (parameterization for precipitation, clouds, radiative processes, etc.), the manner in which various physical processes are approximated, and the approximations made when numerically solving the equations governing the physical processes.

The World Meteorological Organization (WMO) has established a World Weather Watch (WWW) program to ensure members obtain the appropriate weather data for operational and research purposes. The WWW program includes a global observing system (GOS), a global data-processing system, and a global telecommunication system (GTS).

The GTS is a co-ordinated global system of telecommunication facilities that support the rapid collection, exchange and distribution of observational data in the framework of the WWW. GOS is a global network of observational stations and a coordinated system of methods, techniques and facilities for making observations on a world-wide scale in the framework of the WWW. For reasons to be described later, it is important to realize that the observational data provided to the NWP processor does not necessarily correspond to or nicely overlay the three-dimensional grid of elements used in the NWP meteorological model. For example, there may be large geographic areas for which no observations are available. In other geographic areas, the observation points may not be well distributed such that there is considerable information for some regions and little information for other regions in proximity.

Although the grid data may be readily available, the grid data does not reflect the large variations in weather that might be experienced within any given region. In other words, the grid data might reflect net predictions for the entire region without being particularly representative of any specific point within the region. More accurate weather prediction data for specific points within a given region is highly desirable.

U.S. Pat. No. 6,823,263 of Kelly, et al. ("Kelly") discloses subdividing a grid element having a coarse spatial resolution into a plurality of grid elements having a much finer spatial resolution. The NWP techniques previously described may be used to generate weather predictions at the finer spatial resolution. As noted by Kelly, however, this still requires significant computational power.

Although Kelly's approach might be useful for a few specific pre-determined points, any other point would be underserved. The prediction associated with one of the pre-determined points may become highly unreliable even a short distance from the pre-determined point.

An alternative approach is to use a less computationally intensive numerical approach guided by the grid data (i.e., coarse spatial resolution prediction data) to generate predictions for either pre-determined sites or user-selected sites. This approach may be applied to predict environmental elements generally and is not otherwise limited to meteorological elements.

Figure 5:
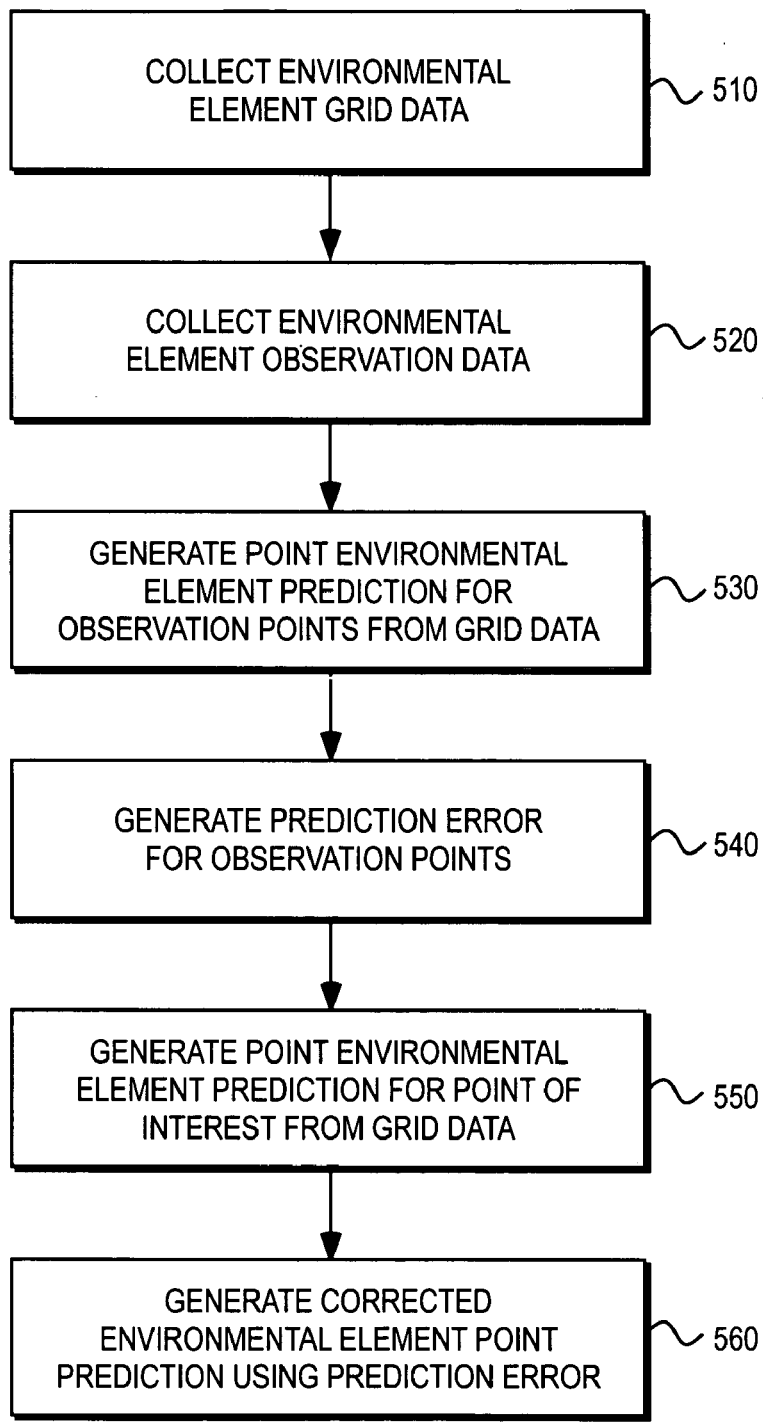
FIG. 5 illustrates one embodiment of a method of generating environmental element predictions for a point of interest.

FIG. 5 illustrates one embodiment of a method of generating environmental element prediction data for a point of interest. Environmental element grid data is collected in step 510. The environmental element grid data has a first spatial resolution defined by a first grid length. Typical grid lengths are 201 cm-120 km.

In step 520, environmental element observation data is collected. The observation data for a given observation point is the actual environmental element data measured at that site. Thus the observation data for a given observation point may comprise a latitude, longitude, altitude, timestamp (i.e., date and time) and any number of environmental elements observed values (e.g., temperature, precipitation, etc.)

Point environmental element predictions are interpolated for the observation points using the grid data in step 530. A prediction error characterizing the error between the environmental element predictions interpolated from the grid and the actual observed values at the observation points is generated in step 540.

A point environmental element prediction for a point of interest is generated in step 550. The prediction error from one or more observation points is used to generate a corrected point environmental element prediction in step 560.

Referring to step 510, only grid data from one altitude at any location is collected in one embodiment. Thus for any X, Y cell, only one grid point along the Z-axis is selected. In one embodiment, the grid point associated with the layer or level closest to the surface is selected. The level selected is thus dependent upon the altitude of the topographical features of the location. Referring to FIG. 3, any X,Y grid location has a plurality of grid points in a vertical column because of the multiple layers of the model. Only one of the layers along the Z-axis is chosen for any given X, Y cell, and the choice is based on the proximity of the layer to the surface as determined by the Earth's topographical features.

Figure 6:
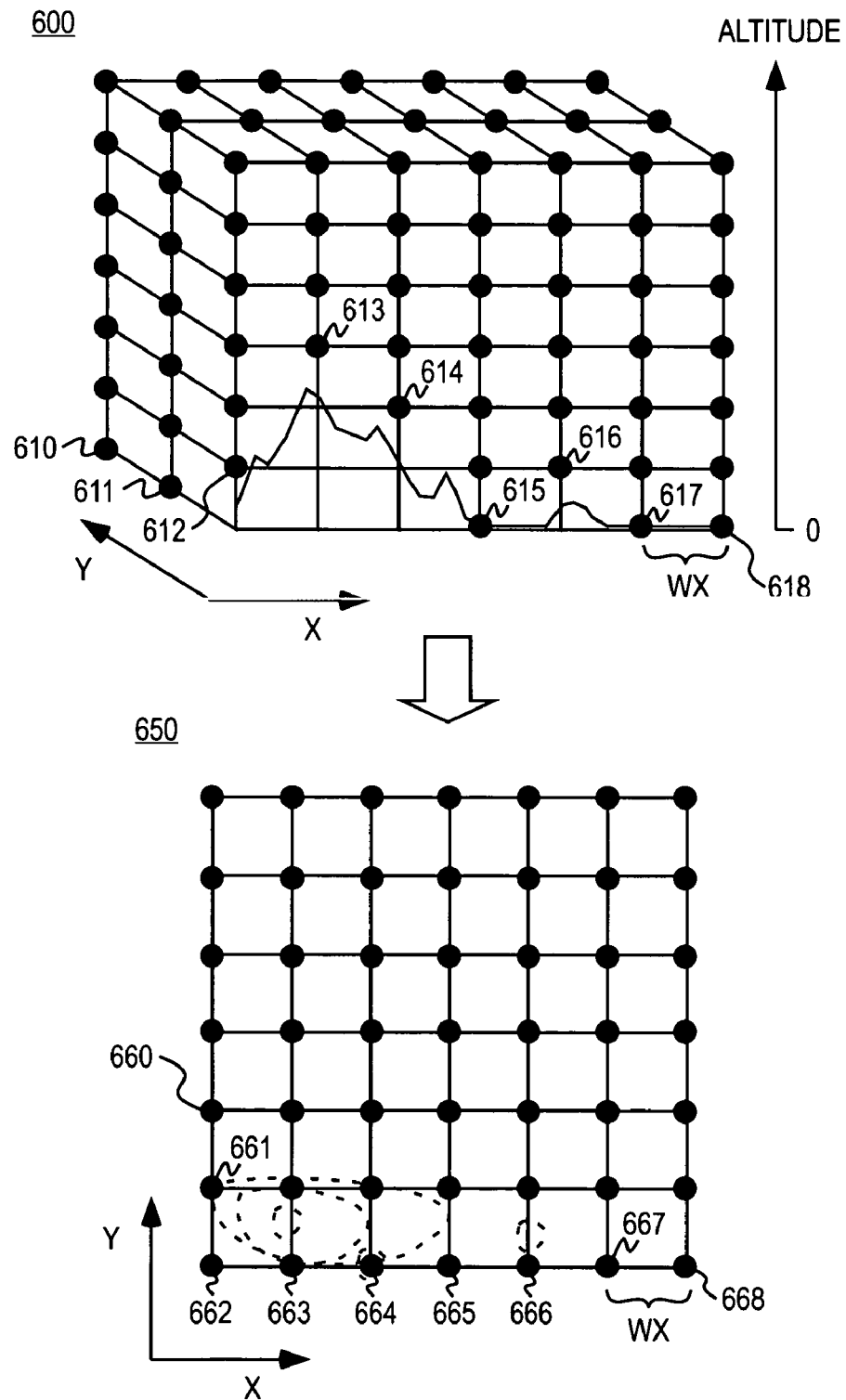
FIG. 6 illustrates one embodiment of mapping a three-dimensional grid of environmental element prediction data to a single layer two-dimensional grid.

FIG. 6 illustrates mapping a three-dimensional set of grid points to a horizontal two-dimensional grid. Grid data from a selected layer at any X, Y location from three-dimensional grid 600 is mapped to a two-dimensional horizontal grid 650. The Z-axis (i.e., altitude) information is preserved with each grid point mapped into the two-dimensional grid so that the altitude of the source of each grid point in two-dimensional grid 650 is known.

In one embodiment, the layer or level closest to the topographical surface at a particular X,Y location is the layer from which a grid point will be selected for that X, Y location. In some grids, the grid point might reside within the center of a grid cell. In the illustrated embodiment, the grid points are located at the corners of a grid cell and thus may be shared by 4 grid cells. The grid point closest to the ground is chosen.

Referring to three-dimensional grid 600, the grid points that meet this qualification include 610-618. Referring to two-dimensional grid 650, the source grid point mapping from three-dimensional grid 600 to each selected grid point 660-668 of two-dimensional grid 650 is as follows: 660←610, 661←611, 662←612, 663←613, 664←614, 665←615, 666←616, 667←617, and 668←618. The result of step 510 is a collection of grid data based on a coarse spatial resolution of grid length WX, wherein the grid point at a specific X, Y location has an associated altitude Z and prediction data specific to the grid point.

Figure 7:
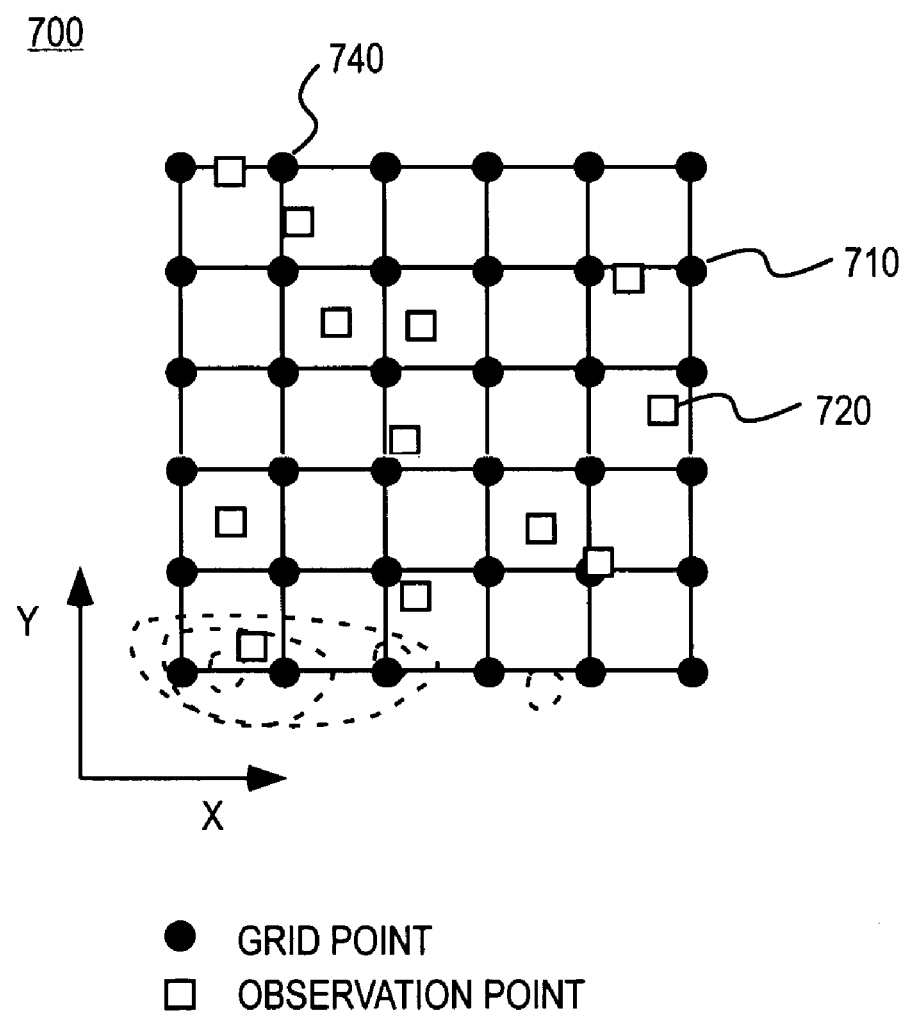
FIG. 7 illustrates one embodiment of environmental element prediction grid data overlayed with observation points associated with environmental element observed data.

FIG. 7 illustrates an overlay of the relative locations of environmental element observation data with the environmental element grid data. The density and distribution of the observation sites or observation points can be expected to vary significantly. Most importantly, the observation points 720 do not necessarily correspond to any grid point locations 710. Due to the lack of regularity of distribution of the observation points, these points and the data associated with them may generally be referred to as scatter points or scatter data.

Figure 8:
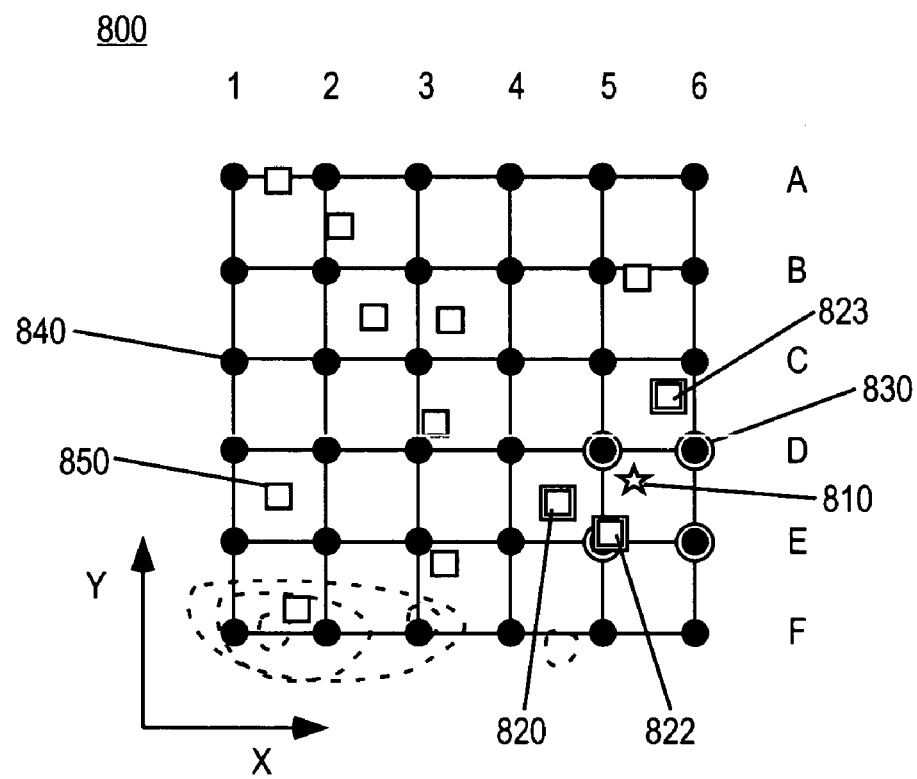
FIG. 8 illustrates one embodiment of a determination of relevance of grid points and observation points for a specific point.

FIG. 8 illustrates one embodiment of a collection of environmental element grid data and the environmental element observation data. With respect to a specific point 810, the data associated with locations that are closer to the point of interest is presumed to be more representative of the expectations at the point of interest 810 than data that is further away from the point of interest. The proximity of the location associated with the grid data to the specific point is determinative of the relevance of the grid data. Thus, for example, with respect to grid points 830 and 840, grid point 830 is presumed to more accurately reflect the expected conditions at point 810.

Similarly, the proximity of observation points to the point of interest is determinative of the relevance of the observation data. Thus, for example, with respect to observation points 820, 822, 823, and 850, the data associated with observation points 820, 822, and 823 is presumed to be more relevant than the data associated with observation point 850.

Figure 9:
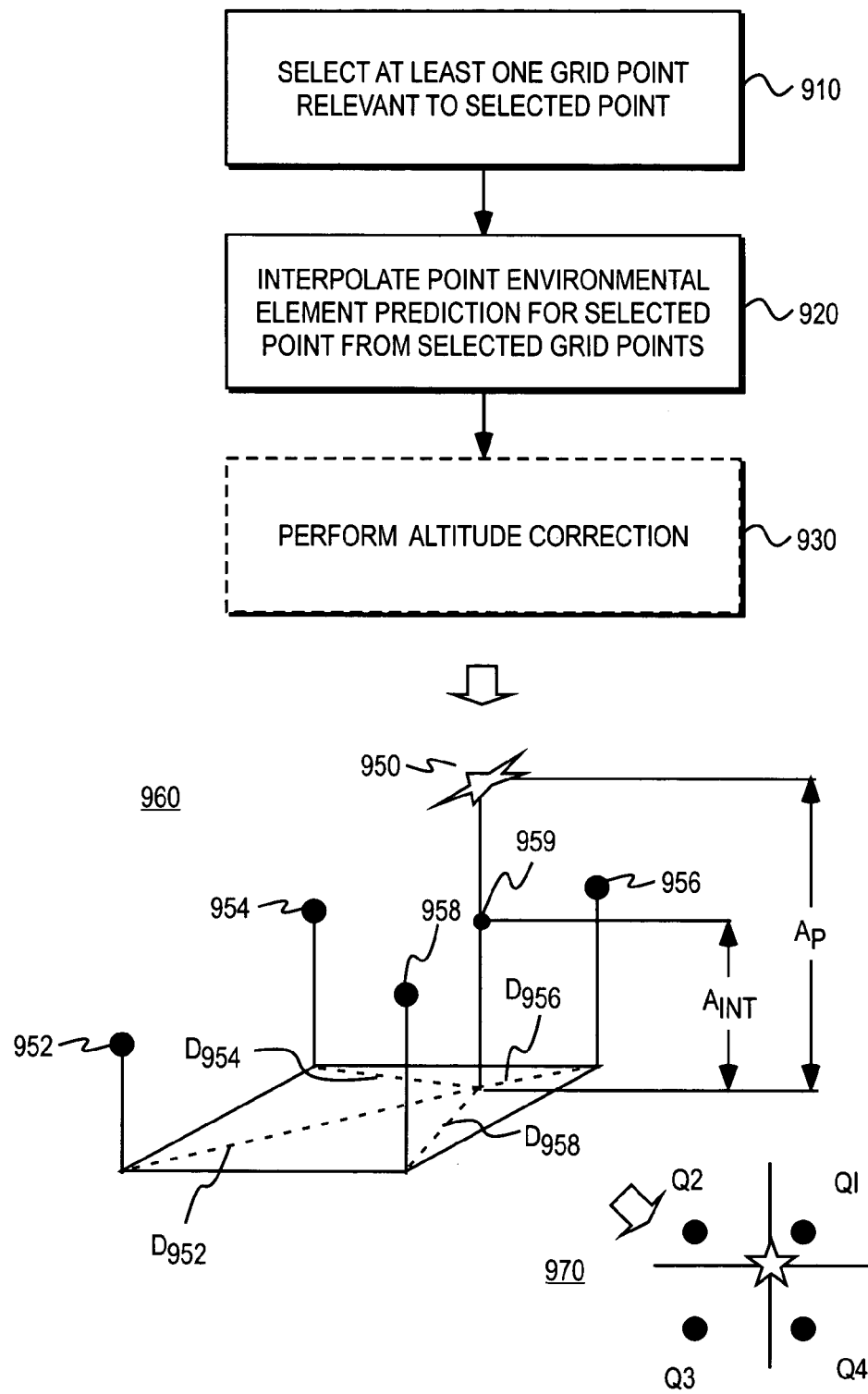
FIG. 9 illustrates one embodiment of a method for generating point environmental element prediction data for a specific point using the environmental element prediction grid data.

FIG. 9 illustrates one embodiment of a method of generating point environmental element prediction data for a selected point from grid points. At least one grid point adjacent the selected point of interest is selected in step 910. Preferably a plurality of adjacent grid points are selected. In one embodiment, at least four grid points distributed about the point of interest are selected. Generally, the "nearest" grid points are the most relevant. In the graphical illustration, grid points 952, 954, 956, and 958 are the grid points adjacent selected point 950. In the event that the co-ordinates of the selected point match those of a grid point, that grid point is sufficient and no additional relevant grid points need to be identified.

A point environmental element prediction is generated from the selected grid points in step 920. In one embodiment, the point environmental element prediction is interpolated using a weighted average of the grid points. The weighting is based on the relative distances between the selected point and each selected grid point with closer grid points weighted more heavily than distant grid points. In the event that the co-ordinates of the selected point match those of a grid point, the grid data associated with that single grid point may be used without interpolation.

In one embodiment, the weighting is inversely related to distance by an exponential function of the form $e^{-kd^2}$, where d corresponds to the distance between the selected point and the selected grid point, where k is a factor that may vary for each environmental element parameter (i.e., k may have one value for temperature and another value for precipitation). An interpolated environmental element value for a parameter, E, based solely on distance from relevant grid points might be calculated as follows:

$$E_{INT} = \frac{\sum_{i=1}^{N} e^{-kd_i^2} E_i}{\sum_{i=1}^{n} e^{-kd_i^2}}$$

where $d_i$ is the X,Y distance between the selected point and the $i^{th}$ selected grid point (e.g., $D_{952}, D_{954}, D_{956}, D_{958}$); $E_i$ is the value of the environmental element of interest at the $i^{th}$ grid point; and $E_{INT}$ is the interpolated environmental element value.

In order to ensure the most relevant grid points are selected and computational simplicity, a threshold operation may be performed. The threshold operation, for example, may examine any of d, $d^2$, $kd^2$ to determine whether a given corresponding pre-determined value is exceeded. Alternatively, the threshold operation may determine whether $e^{-kd^2}$ is less than a pre-determined value.

The selected grid points may be at different altitudes than the selected point. For some environmental element predictions, an altitude correction may be appropriate. Thus an altitude correction is performed in step 930, if necessary. As with the horizontal displacement, the vertically closer grid points are expected to be more relevant than the more distant grid points.

In one embodiment, the altitude correction is based on the difference between the altitude of the selected point and an interpolated altitude from the selected grid points. An interpolated altitude may be calculated in any number of ways. In one embodiment, the interpolated altitude is calculated as follows:

$$A_{INT} = \frac{\sum_{i=1}^{N} e^{-kd_i^2} A_i}{\sum_{i=1}^{n} e^{-kd_i^2}}$$

where $A_i$ is the altitude of the $i^{th}$ grid point. Thus the interpolated altitude may be computed in the same manner as the interpolation for any environmental element.

The varying of a environmental element such as temperature with altitude is referred to as "lapse rate". Lapse rate may be used for performing altitude corrections for some environmental elements (e.g., temperature). The lapse rate may change throughout the course of a day and from point to point. The change in temperature from one altitude (a1) to another (a2) can be determined by the following:

$$\Delta T = \int_{a1}^{a2} L(a) da$$

where L(a) is the lapse rate.

FIG. 1 illustrates one embodiment of a lapse rate 112 of temperature through various layers of the atmosphere. An observed or modeled lapse rate specific to the location of the point of interest may be used. Alternatively, a standardized lapse rate may be used irrespective of location. In some cases, the lapse rate over a particular range of altitudes may be approximated as a constant, L.

In order to perform the altitude correction for temperature, the following equation may be applied:

$$T_P = T_{INT} + \int_{A_{INT}}^{A_P} L(a) da$$

where $T_P$ is the temperature at the selected point, $T_{INT}$ is the interpolated temperature for the interpolated altitude, and L(a) is the lapse rate in the altitude range from the interpolated altitude ($A_{INT}$) to the altitude ($A_P$) of the selected point. In the event that a standardized constant lapse rate is applicable, the equation becomes:

$$T_P = T_{INT} + L(A_P - A_{INT})$$

The point environmental element prediction is not limited to a specific number of grid points. Although accuracy and computational resource requirements may vary depending upon the number and location of selected grid points, any number of grid points may be used. In one embodiment, at least four grid points distributed about the selected point (e.g., a point of interest) are used (e.g., at least one grid point located in each quadrant (Q1-Q4) of a Cartesian plane having co-ordinate axes with an origin centered upon the selected point). The Cartesian plane is the two-dimensional horizontal plane of grid points described above.

Referring to FIG. 5, the method of FIG. 9 may be applied to generate a point prediction for the point of interest (step 550) as well as one or more observation points (530).

The point prediction for the observation point(s) is useful for estimating prediction errors. Actual observed values can be compared with the values that were previously predicted to determine corrections that would have been needed for the previously predicted values. Although the actual error in the prediction is not known until the time period of interest has passed, the use of standard statistical techniques such as regression analysis may be used in conjunction with the historical error to estimate the future prediction errors.

Figure 10:
FIG. 10 illustrates one embodiment of a data collection for estimating prediction errors for an observation point.

FIG. 10 illustrates a table containing the data to be collected to permit estimating the prediction error associated with a given observation point for a selected environmental element (i.e., maximum temperature). Table 1010 includes columns for date, observed, and 0-day, 1-day, etc. to N-day lagging predicted values. The data corresponds to maximum temperatures associated with observation point RZ1 at 30.1° N 30.1° W and 28 feet above sea level for the indicated dates.

Each day, a maximum temperature forecast is calculated from the relevant grid points for up to N days in advance. These maximum temperatures were interpolated from relevant grid points using the process of FIG. 9. The value in the x-day column for a given date reflects the maximum temperature that was predicted x days prior to the given date. Thus, for example, value 1012 indicates that the maximum temperature predicted for date May 2, 2005 on May 2, 2005, was 86° (when x=0, the value is the value calculated on the same date). Value 1014 indicates that the maximum temperature predicted on May 5, 2005 for May 7, 2005 (i.e., a 2-day forecast on May 5, 2005) was 78°. The predicted values are lagging because they refer to predictions made on preceding dates about a subsequent date.

Table 1050 illustrates the historical error by date to be used for estimating the prediction errors for a given environmental element. The prediction error for the 1-day prediction may be different from the prediction error for the N-day prediction. Thus the prediction errors may be grouped by columns (columns 1052-1058) to permit separate estimations of the prediction errors (i.e., estimation of the 1-day prediction error distinct from the estimation of the 2-day prediction error, etc.) The prediction errors may also vary amongst different environmental elements such that the error for each environmental element must be distinctly tracked.

Referring to table 1050, the prediction error for a given environmental element $E^m$, at prediction observation point i, prediction timeframe t, on a given date j is calculated as $$ERR_i^{m,t,j} = E_i^{m,t,j} \text{observed} - E_i^{m,t,j} \text{predicted}$$

The actual prediction error is clearly only known after the time period of interest has passed. Once a sufficient history of predicted and observed data is collected, various statistical techniques (e.g., linear regression, average, etc.), other mathematical techniques, or even artificially intelligent approaches (e.g., neural networks) may be used on the historical prediction errors to estimate the current prediction error for each prediction timeframe (e.g., one-day, two-day, etc.). In various embodiments 30-60 days of errors are collected for each observation point and each environmental element. The result is that an estimated error of the form $EST\_ERR_i^{m,t,j}$ may be generated from the historical data for each environmental element m, observation point i, prediction timeframe t, and given date j. Given that the most current estimate is used for correction, the date j is omitted for clarity (i.e., $EST\_ERR_i^{m,t}$).

Thus for any given date, each observation point may have a prediction error associated with each prediction timeframe. These prediction errors are used to correct the corresponding interpolated prediction from the grid data for any point of interest using an estimated prediction error.

In one embodiment, the prediction error used to correct a point prediction is estimated from the prediction errors associated with relevant observation points. In particular, the prediction error $EST\_ERR_{INT}$ for the point of interest may be interpolated from one or more observation points (i) as follows $$\text{EST\_ERR}_{INT}^{m,t} = \frac{\sum_{i=1}^{N} e^{-kd_i^2} \text{EST\_ERR}_i^{m,t}}{\sum_{i=1}^{n} e^{-kd_i^2}}$$

where $d_i$ is the distance between the observation point and the point of interest.

As with the earlier calculations, k is a co-efficient that may be derived from experience. The co-efficient k may be different for different environmental elements as well as for different prediction time frames (i.e., the prediction error for 1 day in advance may utilize a different k (k1) than a prediction error for 2 days in advance (k2) such that k1≠k2. Moreover the k1 for temperature may be different than the k1 for precipitation).

In order to simplify computations for any of the interpolations a subset of the observation points or grid points may be selected based on relevancy. Thus, for example, a threshold operation such as determining whether $e^{-kd_r^2}$ is less than a pre-determined threshold may be used to determine whether the $r^{th}$ observation point or grid point (as the case may be) should be included in the computation.

The estimated error for the point of interest is thus the estimated prediction error interpolated from the observation points. This information is used to predict the point of interest's environmental element values at various prediction timeframes as follows:

$$E_p^{m,t} = E_{INT}^{m,t} - EST\_ERR_{INT}^{m,t}$$

where $E_p^{m,t}$ is the predicted value for environmental element m and prediction timeframe t at the point of interest.

The number and category of environmental elements to be predicted may vary upon the intended application. Air temperature, pressure, wind speed, wind direction, probability and amount of precipitation, humidity, cloud cover, and visibility are a subset of environmental elements generally grouped as meteorological elements. Marine elements might include water temperature, wave height, wave direction, etc. Although the specific calculation for a given environmental element might vary among elements, the methods and apparatus described are not intended to be limited to a pre-determined set of environmental elements. Examples of other environmental elements might include heat index, wind chill, drought index, soil moisture, levels of ultraviolet radiation, aerosol dispersion, etc.

Centralization of the storage and maintenance of the environmental element prediction grid data and the observed environmental element data is one practical approach for supporting a number of users who may be interested in environmental element prediction data for various locations.

Figure 11:
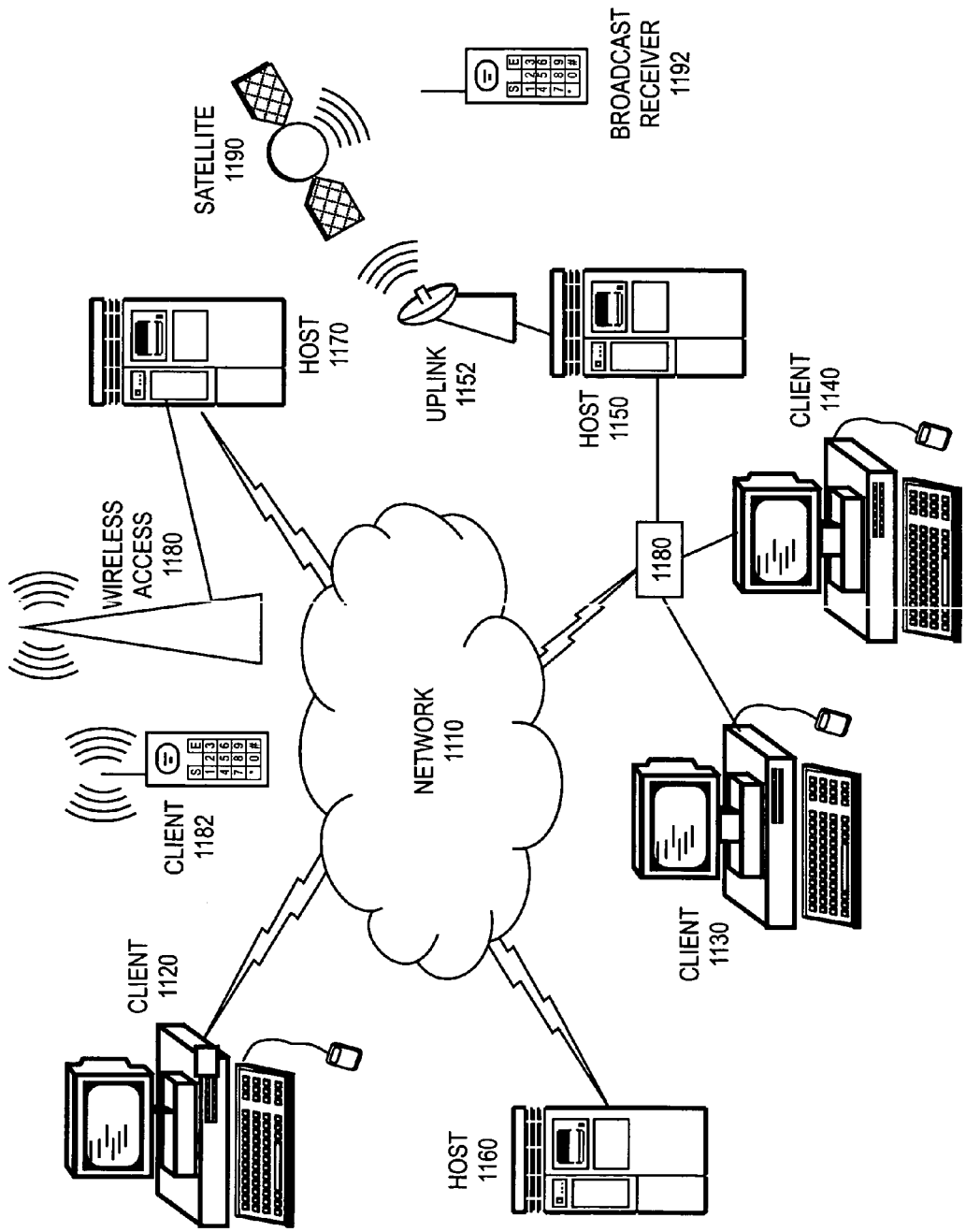
FIG. 11 illustrates one embodiment of a network environment.

FIG. 11 illustrates a network environment including a communication network 1110. Although the network may be an "intranet" designed primarily for access between computers within a private network, in one embodiment network 1110 is the network commonly referred to as the Internet. The Internet includes a combination of routers, repeaters, gateways, bridges, and communications links with computers spread throughout the world. The Internet facilitates communication between computers or other devices connected to the Internet.

Some of the computers are referred to as "host" or "server" computers because they provide services upon request. The computers issuing the requests are referred to as "client" computers. The network environment of FIG. 11 includes multiple (N) client computers (1120, 1130, 1140) and multiple (M) host computers (1150, 1160, 1170). In some cases, a plurality of computers (e.g., 1130, 1140, 1150) may reside on a common network that shares a common connection (e.g., via router 1180) to the Internet. The connection between the client computer and the host may include wireless links. Thus handheld devices such as cellular phones, personal digital assistants, etc. (1182) may be client computers or in some cases servers or hosts.

The host computers (e.g., 1150) and client computers (e.g., 1120) can be entirely different architectures, however, to facilitate communication on network 1110 they communicate by using a common communication protocol. In one embodiment, this protocol is the Transmission Control Protocol/Internet Protocol (TCP/IP).

The client computers can request services from a host computer. Hosts typically support file retrieval services, search services, communication services, and recreational services. A subset of Internet host computers provide multimedia information services. This subset of host computers permit physical access to the abstract body of information referred to as the World Wide Web (WWW) and are referred to as WWW hosts or WWW servers.

World Wide Web host computers support a protocol that permits users with computers having different architectures, operating systems, and application programs to share multimedia enhanced documents. In one embodiment, this protocol is the Hypertext Transport Protocol ("HTTP"). The multimedia-enhanced documents are often referred to as "web pages." The application specific to a given hardware platform that permits viewing the web pages is often referred to as a browser.

Uniform Resource Locators (URLs) provide a standard way of referencing Internet resources including web resources. A URL identifies the protocol as well as the location of the item to be retrieved. The URL is not limited to other World Wide Web sites and may in fact refer to other Internet protocols and services such as Gopher, WAIS, UseNet news, Telnet, or anonymous FTP (file transfer protocol).

A browser can access a host machine identified by the URL and then retrieve the resource specified by the URL. The resource identified by the URL may be static or dynamic. A static resource is a resource that exists prior to the request and is simply provided upon request. Examples of static resources include document, image, movie, sound, or static web page files. Dynamic resources are generated upon request and typically require some type of information from the user (e.g., a database query requires search parameters).

Consider the following URL:
http://www.infoweather.com/
weather?LAT=30.1&LON=30.1

This URL identifies the protocol as "http" ("Hypertext Transport Protocol"). The portion "www.infoweather.com" is an Internet host address or symbolic representation of an Internet host address. Thus "www.infoweather.com" identifies a specific host. The portion of the URL identifying the specific host is often referred to as a web site. The remainder is a path for the resource that is being accessed. In the example above, the URL causes the application "weather" to execute with the parameters LAT=30.1 and LON=30.1 for the purpose of dynamically generating a web page containing weather related information at that geographic location. This dynamically generated web page may then be presented to the requesting client effectively permitting a client to request and receive environmental element predictions for a specified point location.

Figure 12:
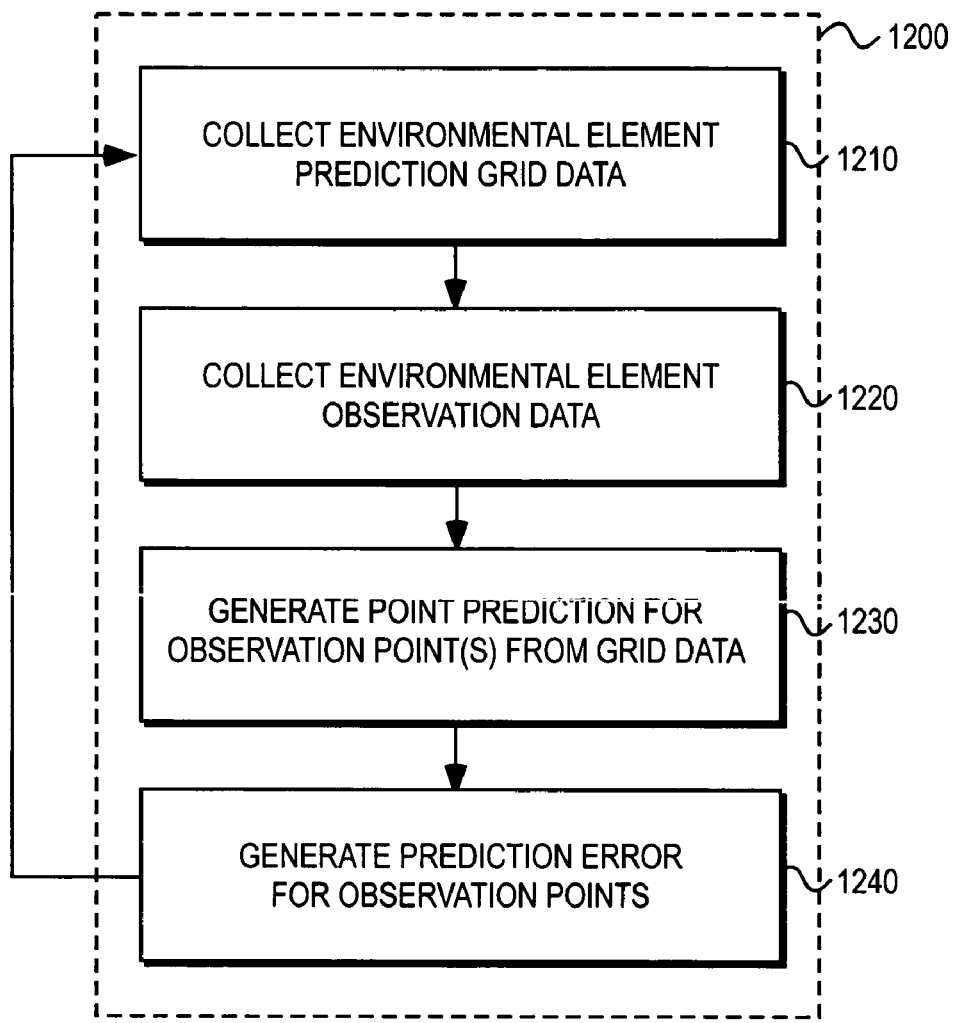
FIG. 12 illustrates one embodiment of server processes supporting generation of point environmental element prediction data in a client-server network environment.

FIG. 12 illustrates one embodiment of a server process 1200 in a client-server network environment. Environmental element prediction grid data is collected in step 1210. Environmental element observation data is collected in step 1220. Point environmental element prediction data is generated for the observation points in step 1230 using the environmental element prediction grid data. In step 1240, prediction errors for the observation points are calculated by comparing the point environmental element prediction data with the environmental element observation data for the observation point. The process may be repeated to maintain an updated collection of prediction errors and grid data.

Figure 13:
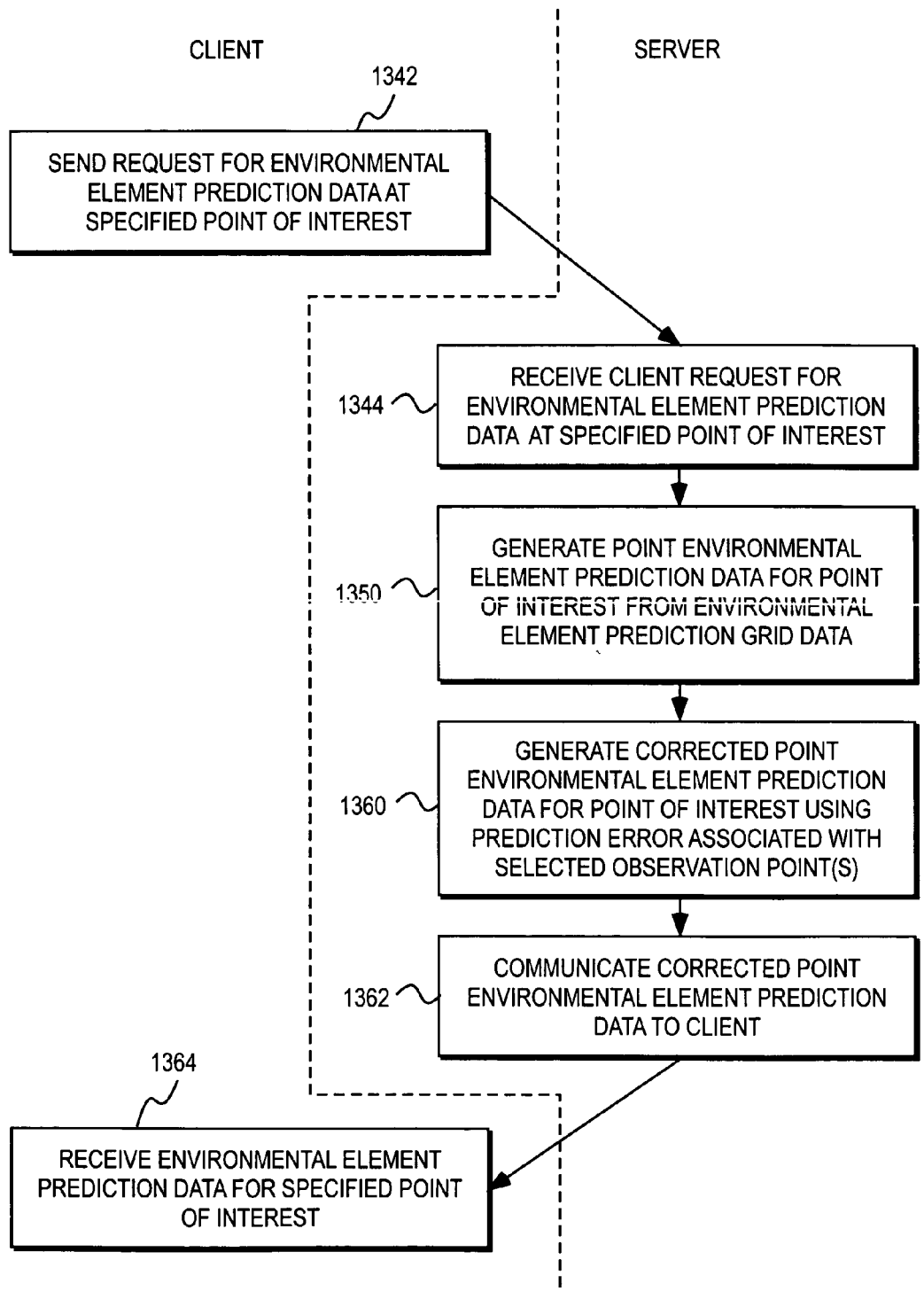
FIG. 13 illustrates one embodiment of a method of generating point environmental element prediction data in a client-server network environment.

FIG. 13 illustrates one embodiment of a method of generating environmental element prediction data in a client-server network environment. The dotted line provides a demarcation for the process steps performed by the client versus those performed by the server or host.

The client communicates a request for environmental element prediction data at a specified point of interest to a server in step 1342. The point of interest may be specified manually or automatically. A GPS locator, for example, may be used to automatically determine the location of the client and said location is used as the specified point of interest. The advantage of manual entry, however, is that locations other than the location of the client may be specified.

The server receives the request for environmental element prediction data for the specified point of interest in step 1344. The server generates the point environmental element prediction data for the point of interest from the environmental element prediction grid data in step 1350. Corrected point environmental element prediction data for the point of interest is generated in step 1360 using the prediction error associated with one or more selected observation points.

The server communicates the corrected point environmental element prediction data for the point of interest to the client in step 1362. If corrections are not necessary or desired, then step 1360 may be omitted. The client receives the environmental element prediction data (corrected or uncorrected) for the specified point of interest in step 1364.

The method of FIG. 13 is well-suited for clients that have little computational ability. The maintenance of the grid data, observation data, predicted error data and the computation of the point environmental element prediction data are all handled by the server.

Figure 14:
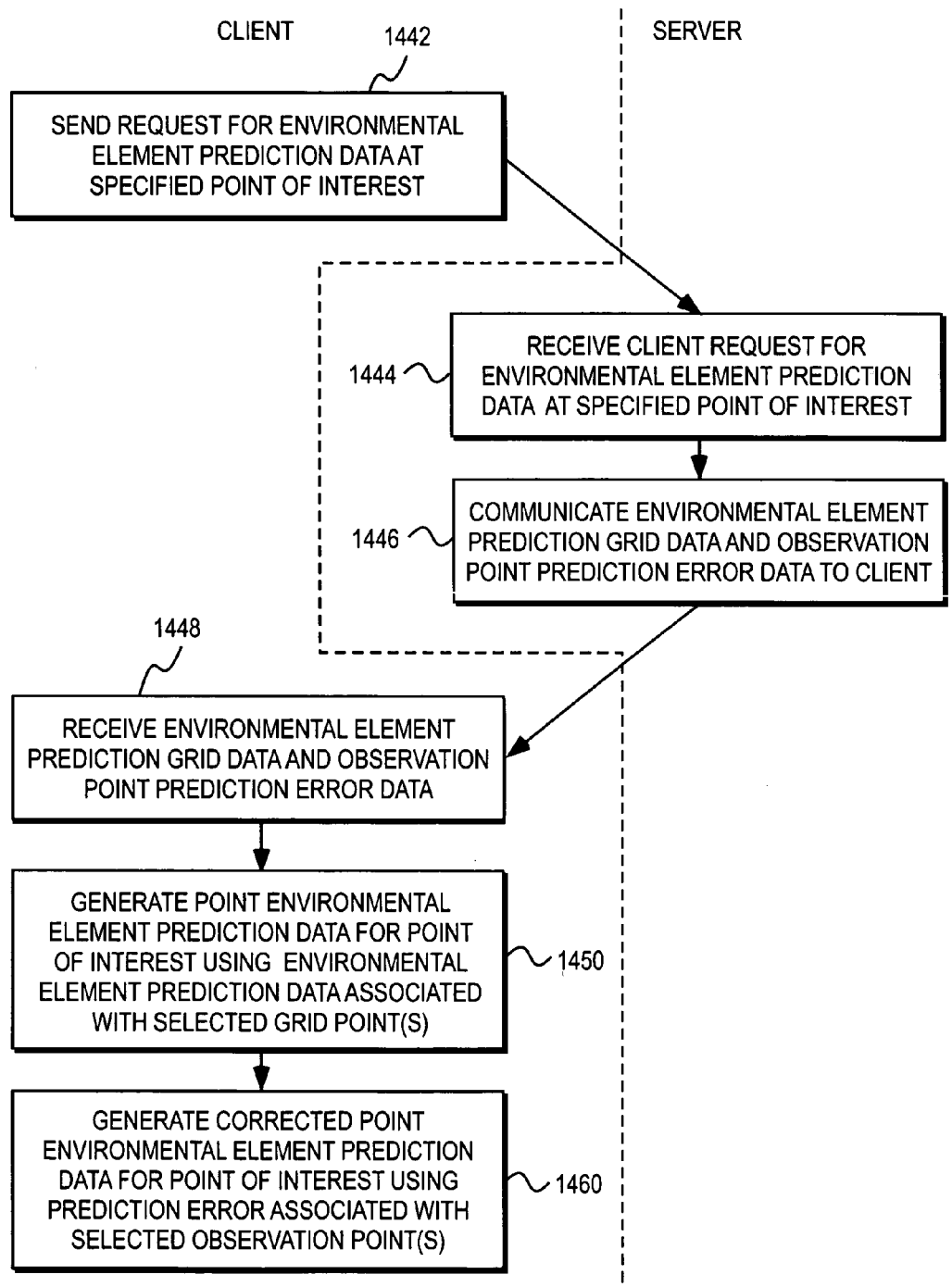
FIG. 14 illustrates an alternative embodiment of a method of generating point environmental element prediction data in a client-server network environment.

One disadvantage of the method of FIG. 13 is that the computational load and contention for the server increases with the increase in client requests. FIG. 14 illustrates an alternative embodiment of the client-server model that places more of the computational load on the client.

The client communicates a request for environmental element prediction data at a specified point of interest to a server in step 1442. The point of interest may be specified manually or automatically. A GPS locator, for example, may be used to automatically determine the location of the client and said location is used as the specified point of interest. The advantage of manual entry, however, is that locations other than the location of the client may be specified.

The server receives the request for environmental element prediction data for the specified point of interest in step 1444. The server communicates environmental element prediction grid data and observation point prediction error data to the client in step 1446. In one embodiment, the server provides the data without regard to the point location. In an alternative embodiment, the server exclusively makes the determination of relevancy when selecting grid point and observation point prediction error to communicate to the client. In yet another embodiment, the server provides data for a region relevant to the point of interest from which the client may select a proper subset. This last embodiment provides a reasonable trade-off between communication bandwidth and supporting client discretion in determining relevancy of grid and prediction error data.

The client generates the point environmental element prediction data for the point of interest using environmental element prediction data from selected grid points in step 1450. As noted above, the selection of grid points may be determined exclusively by the server, exclusively by the client, or collectively by both the server and client in various embodiments. The client, for example, may select a proper subset of the grid points provided by the server.

The client generates corrected point environmental element prediction data for the point of interest in step 1460 using the prediction error associated with one or more selected observation points. Selection of observation points may likewise be determined exclusively by the server (by strictly limiting data provided), exclusively by the client (i.e., client receives all data from server), or collectively by both the server and client in various embodiments. If corrections are not necessary or desired, then step 1460 may be omitted.

The client-server approach of FIG. 14 places a greater computational burden on the client. Although the server load may be reduced on an individual client basis compared to the process of FIG. 13, the server load still inherently increases with the number of clients. This approach may become undesirable as the number of clients or the amount of data transferred per client increases. In addition, bi-directional communication is inherently required for the client-server architecture.

An alternative broadcast approach eliminates the contention for the server as well as the requirement for bi-directional communication with the server. The term "broadcast" is generally characterized as a communication from a transmitter to one or more receivers. In a classic broadcast environment (e.g., over-the-air broadcast television, radio, satellite broadcast, etc.), the transmission is unidirectional and the broadcaster has no knowledge of the identity or number of receivers receiving the broadcast. Any receiver within the coverage area of the transmitter can receive the broadcast.

More recent broadcasting techniques (e.g., NARROWCAST, POINTCAST, UNICAST, ANYCAST, MULTICAST, etc. such as might be used in a computer network environment) permit specifying a group of one or more intended recipients. As with the classic broadcast environment, these more recent broadcasting techniques do not require bi-directional communication with the receivers. The information is transmitted substantially simultaneously to all members of a specified group of two or more intended recipients (individual recipients might ultimately receive the broadcast information at different times depending upon different latencies within the network topology).

Figure 15:
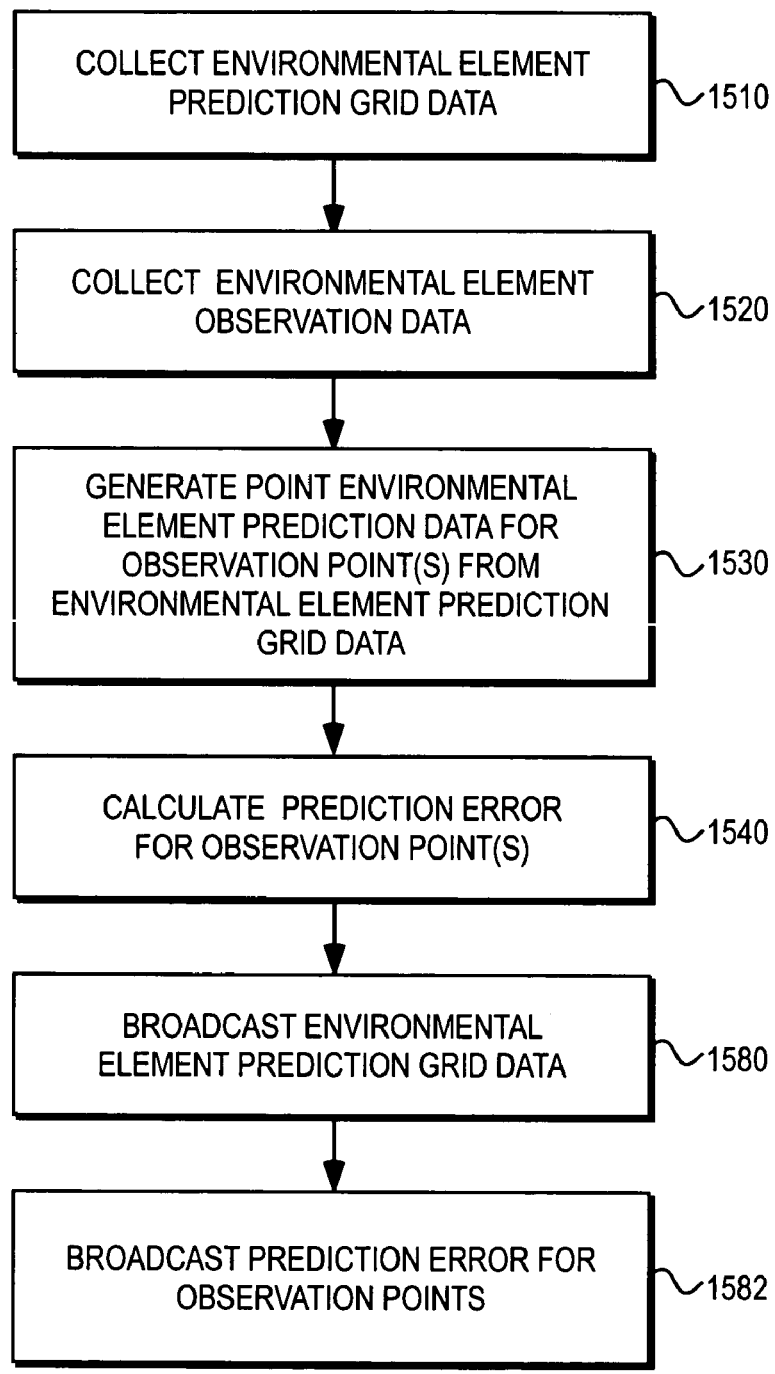
FIG. 15 illustrates one embodiment of server processes supporting generation of point environmental element prediction data in a broadcast network environment.

FIG. 15 illustrates one embodiment of server processes supporting generation of point environmental element predictions in a broadcast network environment. The broadcast process of FIG. 15 is similar to the client-server process of FIG. 13 with the requisite steps added for broadcasting the data.

The broadcast server collects the environmental element prediction grid data in step 1510. The environmental element observation data is collected in step 1520. Point environmental element prediction data is generated for the observation points using the environmental element prediction grid data in step 1530. Prediction errors for the observation points are calculated in step 1540. The prediction error is determined from the generated point environmental element prediction data and the environmental element observation data. The environmental element prediction data is broadcast in step 1580. The prediction error for the observation points is broadcast in step 1582.

FIG. 15 is intended to represent an overall process flow, however, various steps or collections of steps may be performed concurrently or in a different order than what is illustrated. For example, steps 1510 and 1530 may be performed concurrently with step 1520. Similarly, steps 1580-1582 may broadcast data resulting from one iteration of steps 1510-1540 concurrently with the subsequent iteration of steps 1510-1540.

Figure 16:
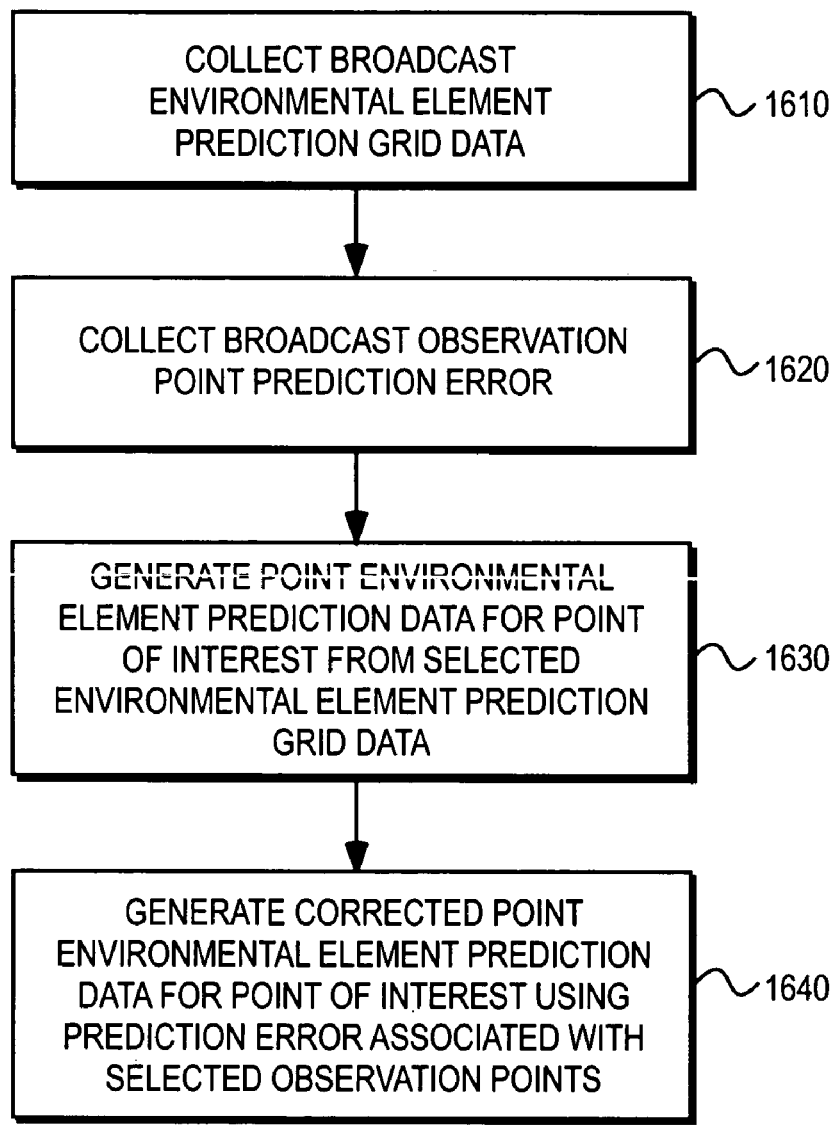
FIG. 16 illustrates one embodiment of a method of generating point environmental element prediction data by a receiving device in a broadcast network environment.

FIG. 16 illustrates one embodiment of a method of generating point environmental element predictions by a receiving device in a broadcast network environment.

Broadcast environmental element prediction grid data is collected in step 1610. Broadcast observation point prediction error is collected in step 1620. Point environmental element prediction data for a point of interest is generated in step 1630 using selected environmental element prediction grid data. Corrected point environmental element prediction data for the point of interest is generated in step 1640 using the prediction error from selected observation points.

The broadcast server may broadcast the grid data and prediction error data grouped by geographic regions. Only a selected few of the observation points and grid points are relevant to the calculation of environmental element prediction data at the point of interest. The receiving device must select the relevant observation points and grid points. As previously indicated, a threshold operation based on distance may be used to determine whether particular grid points or observation points are relevant.

Figure 17:
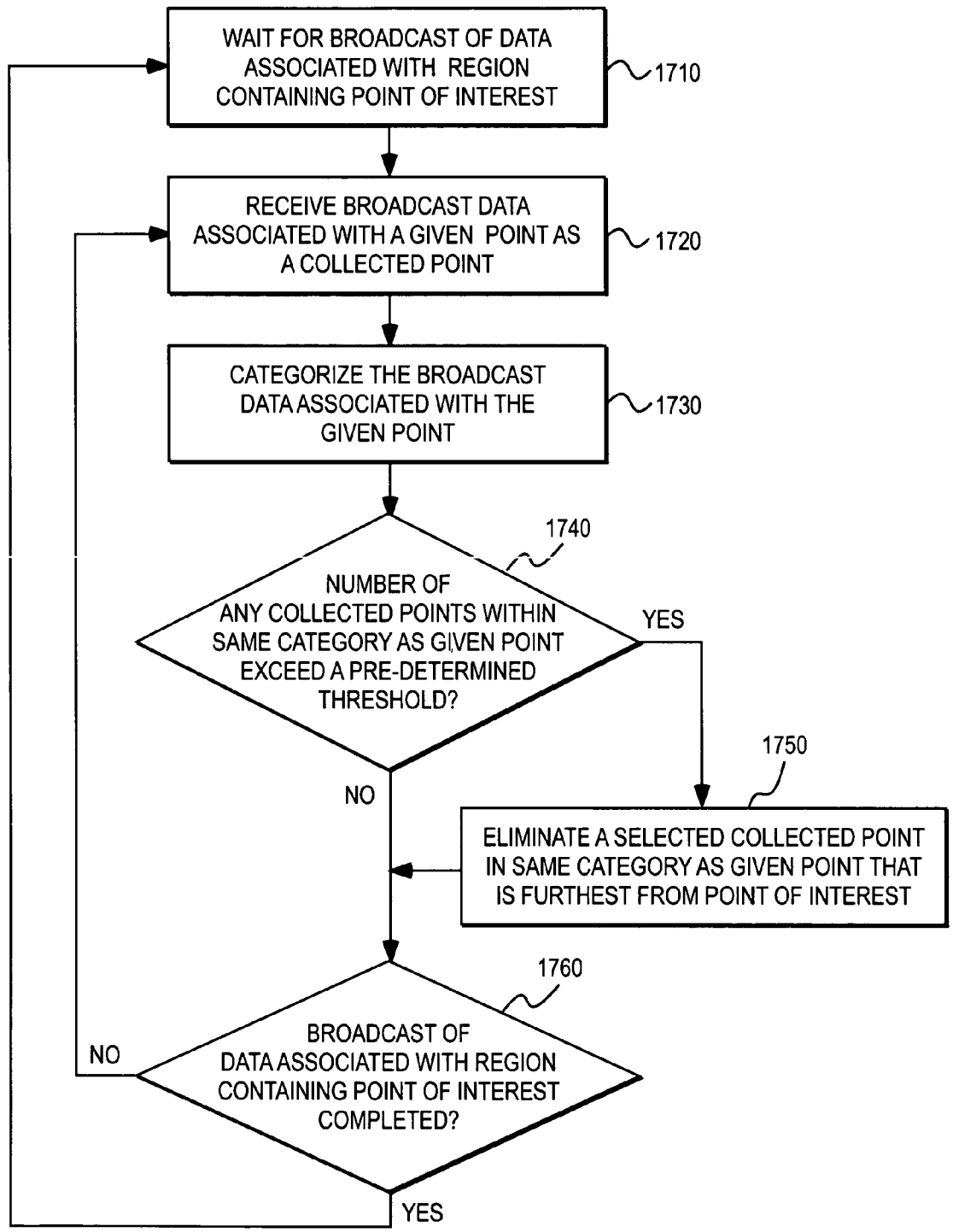
FIG. 17 illustrates one embodiment of a method of collecting broadcast data for a point of interest.

FIG. 17 illustrates one embodiment of a method for collecting the relevant broadcast data. In one embodiment, the observation point prediction error data and the environmental element prediction grid data is grouped and broadcast by region. With this approach, a broadcast recipient or receiver need only handle the data associated with the relevant region rather than analyzing all broadcast data for a determination of relevance. The broadcast data is collected based on its relevance to the point of interest.

For computational efficiency, step 1710 indicates waiting for the broadcast of data associated with a region (i.e., "region of interest") containing the point of interest. Once the data for the region of interest is broadcast, the data collection for the point of interest may begin.

In step 1720, broadcast data associated with a given site is received as a collected site. In step 1730, broadcast data associated with the given site is optionally categorized. Categorization permits subsequent filtering based on various relevance criteria. For example, if environmental element grid data or prediction error data from sites distributed about the point of interest are desired, the given site may be categorized by its quadrant relative to the point of interest. In one embodiment, the quadrants are defined as follows:

quadrant 1: $0° \leq \alpha < 90°$
quadrant 2: $90° \leq \alpha < 180°$
quadrant 3: $180° \leq \alpha < 270°$
quadrant 4: $270° \leq \alpha < 0°$ The device receiving the broadcast data necessarily has a finite memory. In order to ensure that the most relevant data is considered given the constraints of the device, step 1740 determines if the number of any collected sites within the same category as the given site exceeds a pre-determined threshold. If so, a selected collected site that is further from the given site yet in the same category as the given site is eliminated in step 1750. Within each category, the most relevant data (as determined by distance from the point of interest) is retained.

After eliminating less relevant data (if necessary), step 1760 determines whether the broadcast of data associated with the point of interest is completed. If not, steps 1720-1760 are repeated until the regional broadcast is completed. If all the data for the region of interest has been broadcast, the process returns to step 1710 to wait until the next broadcast of data for the region of interest.

The process of FIG. 17 may be used to collect environmental element prediction grid data and prediction error data most relevant to the point of interest. Once all the information for a given region is broadcast, the collected data may be used to generate corrected point environmental element prediction data for the point of interest.

Figure 18:
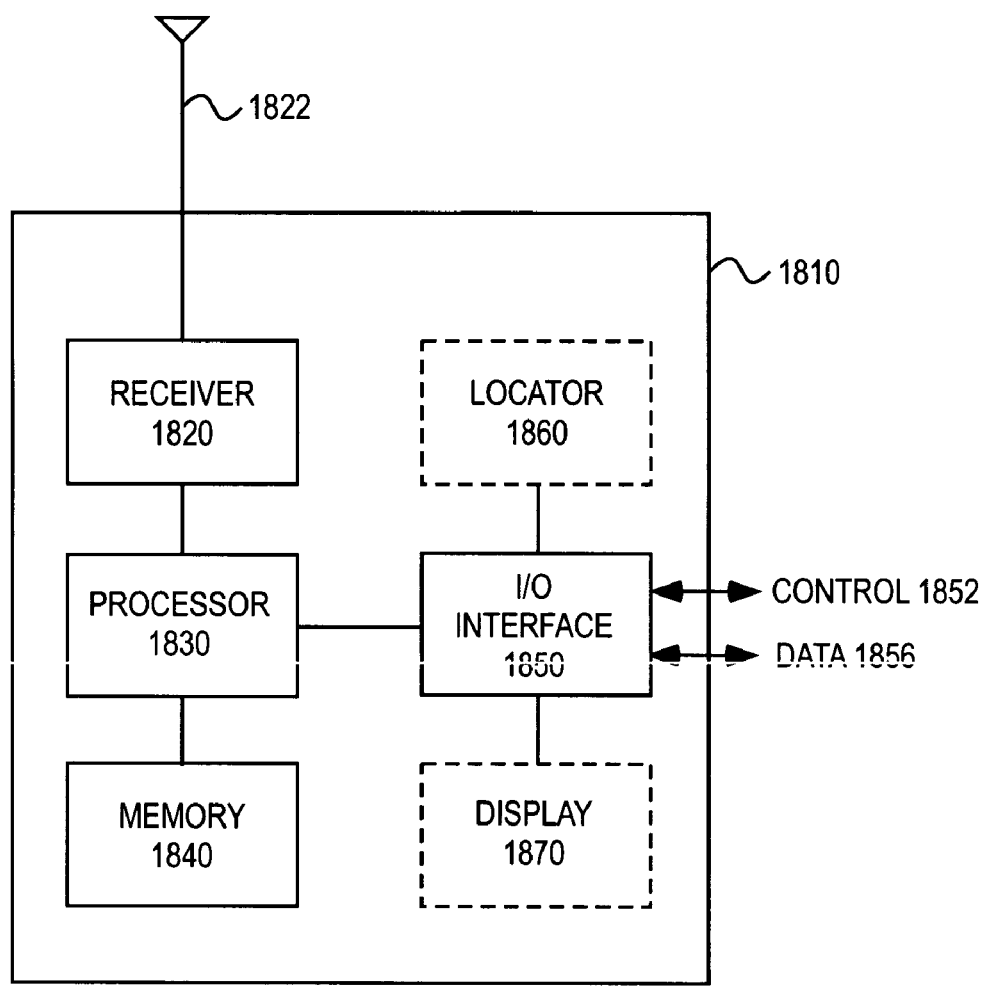
FIG. 18 illustrates one embodiment of an environmental element prediction device (EEPD).

FIG. 18 illustrates one embodiment of a device 1810 for receiving broadcast data and generating a point environmental element prediction. The environmental element prediction device (EEPD) includes a receiver 1820 for receiving the broadcast data. In the illustrated embodiment, antenna 1822 permits receiver 1820 to receive wireless broadcasts (see, e.g., broadcast receiver 1192 of FIG. 11 receiving broadcast data from host 1150 via uplink 1190). In alternative embodiments, receiver 1820 may be coupled to receive broadcasts using physical couplings such as wires or optical fibers.

Device 1810 includes a memory 1840 for storing collected data and for working memory when processor 1830 is performing the computations required to generate point environmental element prediction data. The device may generically be referred to as a "weather aware device" (WAD), particularly when the environmental elements predicted include meteorological elements.

Device 1810 includes an input/output (I/O) interface 1850 controlling external processes as well as providing an interface between the processor 1830 and various peripherals such as a locator 1860 or a display 1870. In one embodiment, I/O interface 1850 provides a digital output representative of an "on" or "off" signal for control 1852. In an alternative embodiment, I/O interface 1850 provides a proportionate signal for control 1852 in either analog or digital form.

In one embodiment, I/O interface 1850 supports communication of data 1856 between the device and external processes. I/O interface 1850, for example, may support an application programming interface (API) for retrieving data collected or computed by the device. I/O interface 1850 may similarly provide for the receipt of data 1856. In one embodiment, programmatic settings for the device are received by I/O interface 1850 (i.e., data 1856). Settings may include, for example: device region, device location, thresholds for environmental element predictions (e.g., assume rain if probability of precipitation exceeds 60%), etc.

In one embodiment, device 1810 includes a locator 1860 to permit automatic determination of its location without user input. Locator 1860, for example, may determine position of the device by satellite telemetry. In one embodiment, locator 1860 determines the position of the device through satellite trilateration using a satellite constellation such as the Navstar® Global Positioning Satellite system. A display 1870 may optionally be provided for displaying the prediction data.

Figure 19:
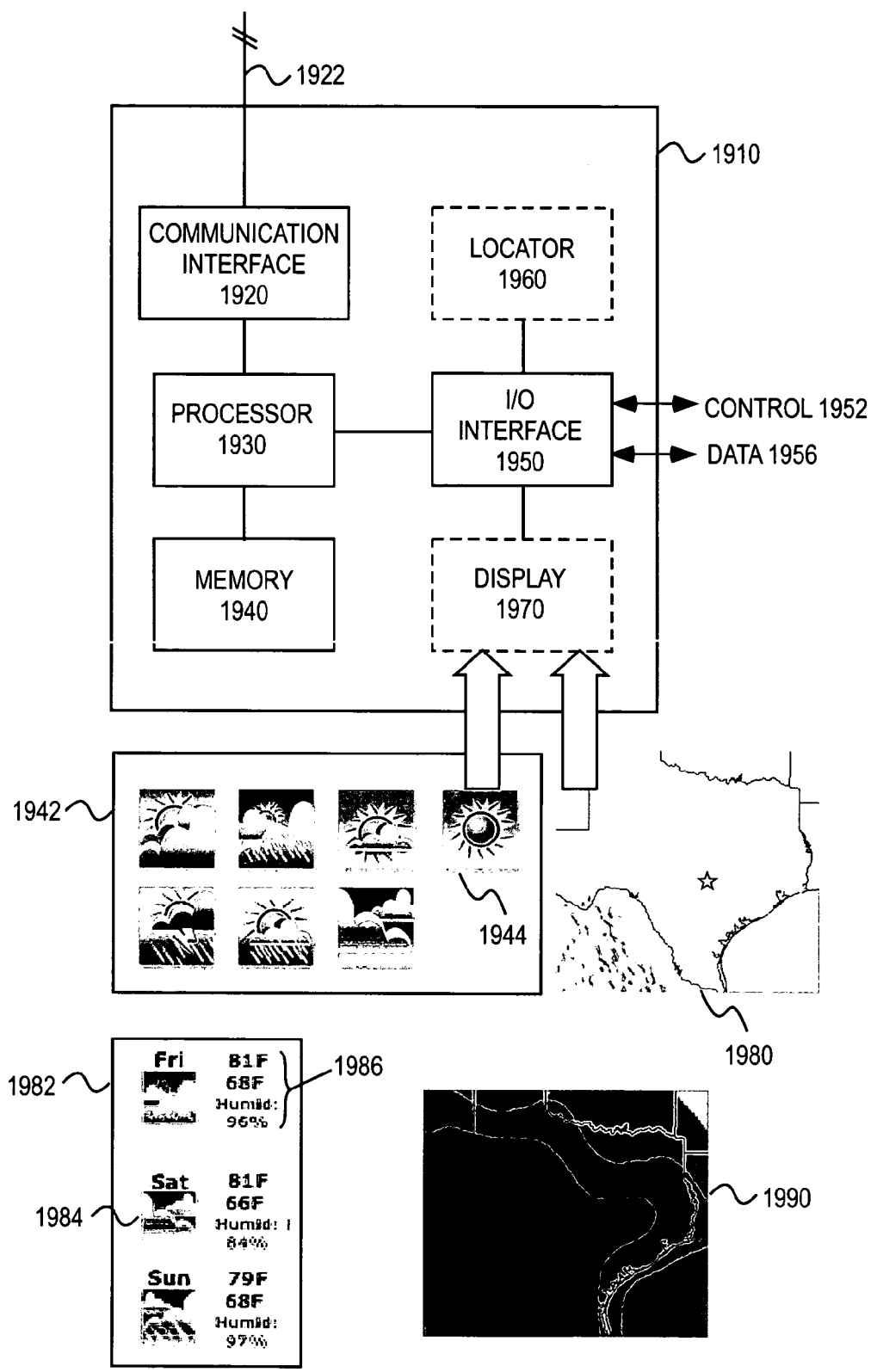
FIG. 19 illustrates another embodiment of an EEPD.

FIG. 19 illustrates an EEPD 1910 having a generalized communication interface. Communications interface 1920 supports receiving the data. For bi-directional communications, the communications interface 1920 supports both transmitter and receiver functionality (i.e., a transceiver). Bi-directional support would be required, for example, with a client-server based EEPD. The communications interface is coupled 1922 as appropriate (e.g., wire, antenna, fiber optic, etc.) to communicate with the source of the environmental element data.

Memory 1940 permits storage of collected data and provides working memory when processor 1930 is performing the computations required to generate point environmental element prediction data. Device 1910 includes an input/output (I/O) interface 1950 for controlling external processes as well as providing an interface between the processor 1930 and peripherals such as a locator 1960 or display 1970. In one embodiment, I/O 1950 provides a digital output representative of an "on" or "off" signal for control 1952. In an alternative embodiment, I/O 1950 provides a proportionate signal for control 1952 in either analog or digital form.

I/O interface 1950 may also support programmatic access to data stored or calculated by the EEPD. I/O interface 1950 (i.e., data 1956), for example, may support an API for retrieving data stored or calculated by the EEPD or alternatively for storing data to be used by the EEPD.

In one embodiment, programmatic settings for the device are received by I/O 1950 as data 1956. Settings may include, for example: device region, device location, thresholds for environmental element predictions (e.g., assume rain if probability of precipitation exceeds 60%), etc. In one embodiment, device 1910 includes a locator 1960 to permit automatic determination of its location without user input. Locator 1960, for example, may determine position of the device by satellite telemetry. In one embodiment, locator 1960 determines the position of the device through satellite trilateration using a satellite constellation such as the Navstar® Global Positioning Satellite system. A display 1970 may optionally be provided for displaying the prediction data.

EEPD 1910 may be suitable for broadcast or bi-directional communication (e.g., client-server model) applications. This EEPD may similarly be incorporated into media device embodiments such as televisions, watches, radios, personal digital assistants, electronic navigators, etc. or other broadcast reception devices as well as devices capable of supporting bi-directional communication (e.g., cellular telephones).

In one embodiment, the media device and the EEPD share the same receiver (e.g., data might be broadcast on a television channel that is otherwise unused, or alternatively broadcast during a vertical blanking interval on one or more channels that might otherwise be used). In an alternative embodiment, the EEPD may use a receiver distinct from that of the media device (e.g., the EEPD incorporates a satellite receiver or a local area network connection distinct from the television receiver of a television).

One device particularly suitable for implementing the EEPD for personal use is a cellular phone. Many cellular phones already incorporate a GPS locator to aid location in the event of an emergency. In addition, many such phones provide a programming environment to permit loading software applications and provide support for accessing the Internet.

The introduction of a device capable of determining environmental element predictions for a specific location enables forward-looking automated control modification. Heating, air conditioning, and irrigation systems are just a few examples of systems that might benefit from a control system that is based at least in part on environmental element predictions rather than merely historical or current environmental element data.

For example, many municipalities and other legislative bodies have required automated lawn sprinkler systems to be outfitted with a "rain sensor" in an effort to avoid wasteful irrigation. The rain sensor is used to inhibits or interrupt irrigation cycles during periods of sufficient moisture.

Rain sensors utilize various techniques to measure the moisture. The soil sensor type, for example, is inserted into the soil and indicates when the moisture content of the earth at the sensor exceeds a pre-determined threshold. Other cup-type sensors capture actual rainfall and provide an indication when the amount of water exceeds a pre-determined threshold level.

Such "rain sensors" are more accurately termed "moisture sensors". When the input variable is moisture, the sensors indicate current moisture conditions. The sensor output correlation with rain is less timely.

For example, the rain sensor may not inhibit irrigation during actual rainfall until sufficient moisture has penetrated the ground near the rain sensor or entered the rain sensor cup. Conversely, the rain sensor may inhibit the irrigation cycle despite the lack of rain simply because the water in the cup or in the ground has not evaporated. However, the rain sensor forces the controller to be responsive to weather recently or currently experienced (i.e., the ground has a certain moisture content because of recent rainfall, or the water level in the cup is still above the threshold) and may be interpreted as providing current conditions if "moisture" is the desired control input. Alternatively, the rain sensor may be viewed as a current control input with a time lag or a "backwards looking" control input if the variable being sensed is actually "rain". The term "hydrological sensor" will be used to include rain sensors, soil sensors, and moisture sensors collectively.

The introduction of a device that is aware of anticipated weather conditions, permits "forward looking" control inputs for the irrigation or other controller. Irrigation, for example, may be inhibited or interrupted if the probability of precipitation within a given timeframe exceeds a pre-determined threshold. Instead of a binary "on/off" control, more sophisticated control may regulate the timing and amount of irrigation based on the time-distributed expected amount of precipitation.

Figure 20:
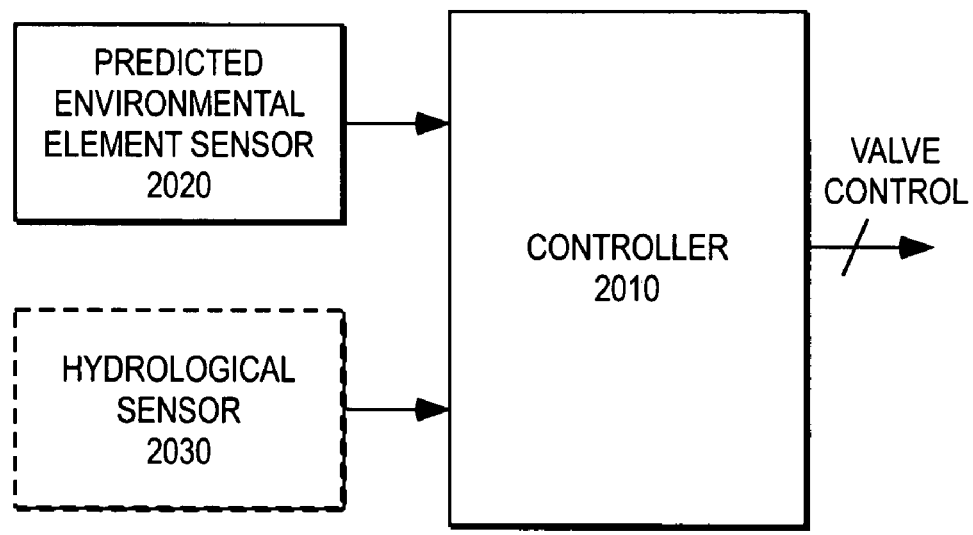
FIG. 20 illustrates one embodiment of a controller incorporating a environmental element predictive sensor and hydrological sensor for plant control.

FIG. 20 illustrates one embodiment of a controller 2010 receiving control inputs from a "forward looking" predictive environmental element sensor 2020 and an optional hydrological sensor 2030.

Preferably, the controller has access to both current conditions as well as predictions for future timeframes. In the absence of an actual current condition sensor (e.g., no hydrological sensor) the relevant conditions may be estimated or predicted using the predictive environmental element sensor 2020 by using the current timeframe predictions. (Environmental element prediction data may include predictions or estimates of current conditions—i.e., 0 days into the future). Thus current conditions sensors serve as auxiliary sensors. When available, the current condition sensor will be relied upon to determine current conditions otherwise the current conditions will be estimated using the predictive environmental element sensor. Generally, a control decision is made based on the "stress level" indicated by the current environmental conditions and the probability of future environmental conditions at that location (i.e., point environmental element predictions) for the purpose of controlling parameters (flow, pressure, amount) of a controlled element (water) within a particular timeframe.

In one embodiment, the controller is an irrigation controller that inhibits or interrupts an irrigation cycle in accordance with a control signal from at least one of the hydrological or the predictive environmental element sensors 2020, 2030. In an alternative embodiment, the controller varies parameters of the controller schedule (i.e., volume of water, length of watering time, cycle iterations, etc.) in response to information provided by at least one of the hydrological and predictive environmental element sensors.

If the predictive environmental element sensor is integrated with the hydrological sensor to form an integrated sensor, existing automated sprinkler controllers may be retrofitted to consider current and predicted environmental element data by simply plugging the integrated sensor into the already existing "rain sensor" input on the irrigation controller.

Figure 21:
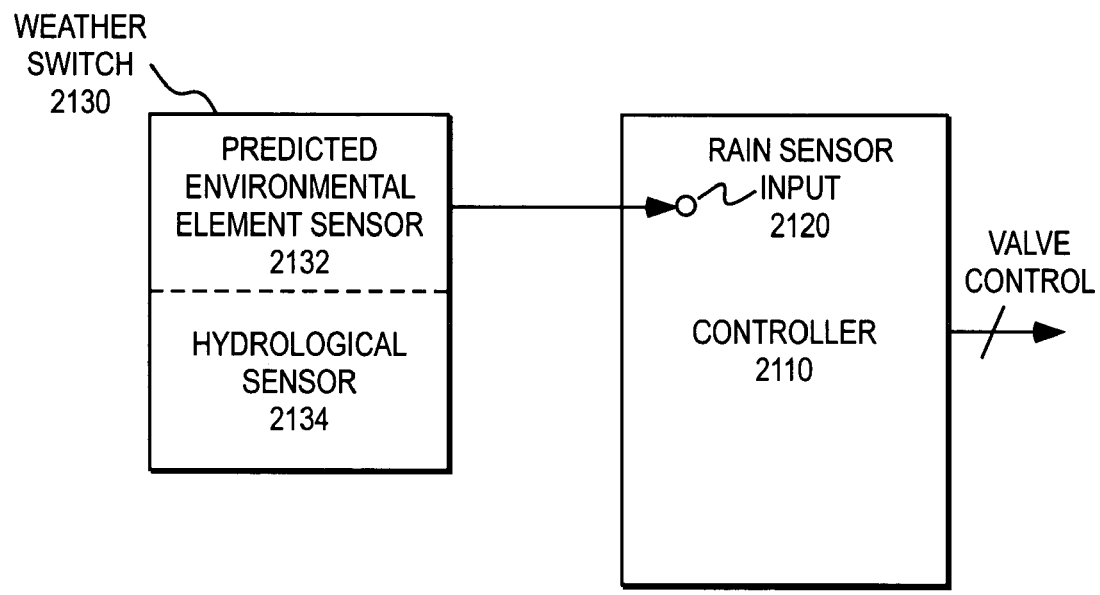
FIG. 21 illustrates one embodiment of an integrated hydrological sensor and environmental element predictive sensor suitable for retrofitting a controller limited to a rain sensor.

FIG. 21 illustrates one embodiment of an irrigation controller 2110 having a rain sensor input 2120. A hydrological sensor 2132 (e.g., a rain sensor) is integrated with a predictive environmental element sensor 2134 (e.g., an EEPD) to form an integrated "weather switch" 2130. The hydrological sensor may sense actual current conditions at the point location. Alternatively, the current conditions can be estimated from the predictive environmental element sensor.

The rain sensor input 2120 of irrigation controller is provided with the output of the integrated weather switch 2130. Generally the weather switch provides an output to inhibit or interrupt irrigation if either the predictive environmental element sensor indicates that precipitation is imminent or the hydrological sensor indicates a period of sufficient moisture. The only time that irrigation is not inhibited is if precipitation is not imminent and the existing moisture level is insufficient. "Imminence" for the predictive sensor may be determined by likelihood of rain and the amount of rain expected. A decision tree implemented in logic may be applied to determine whether to irrigate, how much to irrigate, and when to irrigate within some pre-determined timeframe.

Figure 22:
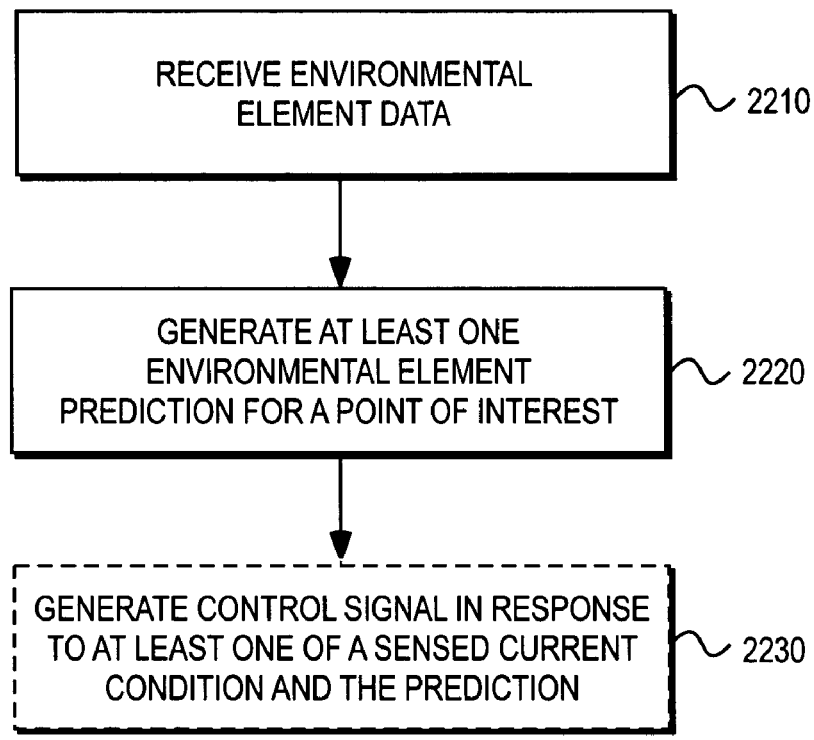
FIG. 22 illustrates one embodiment of a process implemented by an EEPD.

FIG. 22 illustrates one embodiment of a process implemented by an EEPD such as the EEPD of FIG. 19. In step 2210, the EEPD receives environmental element prediction data. In step 2220, the EEPD generates at least one environmental element prediction for a point of interest. In step 2230, the EEPD optionally generates a control signal in response to at least one of a sensed current environmental element condition and the prediction.

Figure 23:
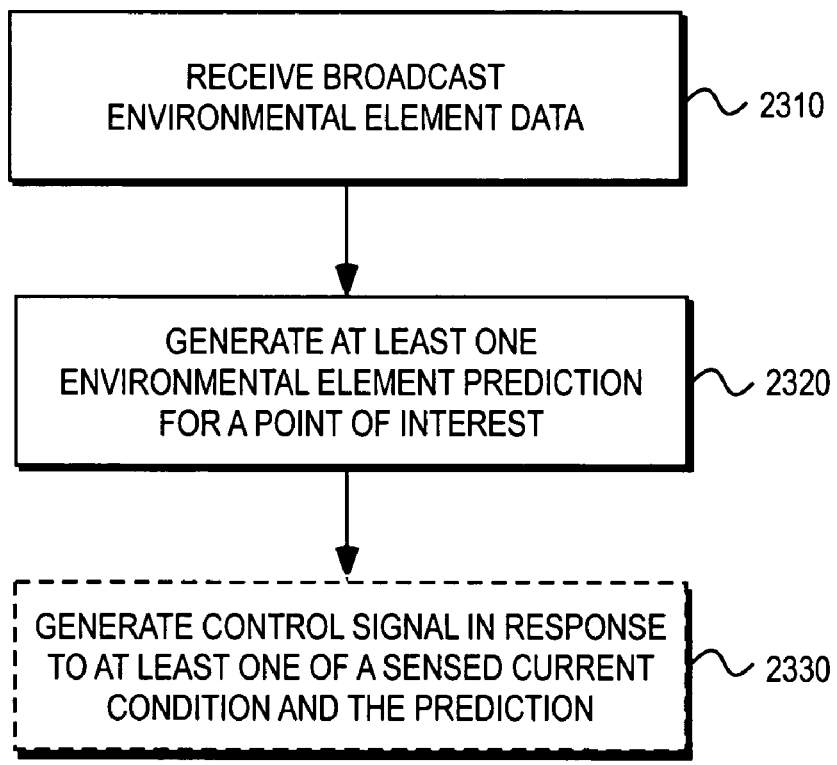
FIG. 23 illustrates another embodiment of a process implemented by an EEPD.

More specifically to broadcast applications, FIG. 23 illustrates one embodiment of a process implemented by an EEPD utilizing broadcast environmental element data such as the EEPD of FIG. 18. In step 2310, the EEPD receives broadcast environmental element prediction data. In step 2320, the EEPD generates at least one environmental element prediction for a point of interest. In step 2330, the EEPD optionally generates a control signal in response to at least one of a sensed current environmental element condition and the prediction.

The control signals of FIGS. 22 and 23 may be generated as a result of logic applied to the predictions or sensed current conditions. The logic may be implemented, for example, as a look-up table, decision tree, or any other suitable device or data structure. The control signal may simply be an "on/off" type control. Alternatively, the control signal may provide more sophisticated information such as when, how long, etc. to perform an activity such as irrigation. The EEPD may generate a different control signal for each prediction timeframe. For example, the EEPD may interpret the predictions and/or the sensed current conditions to provide a control signal for each prediction timeframe.

Examples of parameters that might be controlled or regulated directly or indirectly by the control signal include electrical power, temperature, fluid flow, etc. For irrigation applications, the fluid is typically water. In one embodiment, the EEPD provides the control based upon at least one of the sensed current conditions (if available) and the predictions that the EEPD has made about environmental elements for a point location, wherein the predictions were derived by the EEPD from the environmental element data it received.

Referring to FIG. 19, for example, such a control signal might be used with respect to the predictions to select one or more specific icons 1942 from a set of icons 1944 for visual indication of predicted weather conditions. (Referring to FIG. 23, step 2330 need not rely on sensed current conditions when generating a control signal or code representative of predicted weather conditions). EEPD 1910 interprets the predictions to generate a control signal or code for each prediction timeframe. The control signal(s) may then be used by the EEPD or an external device to select icons corresponding to the control signals. I/O interface 1950 is utilized to display the selected icon 1942 on display 1970 thus providing a viewer with a visual indicator corresponding to the predictions for one or more environmental elements and one or more prediction timeframes.

In one embodiment, the EEPD determines the appropriate icon to display. In an alternative embodiment, an external process uses the I/O interface 1950 to obtain data received or computed by the EEPD (including the control signals or codes generated in response to at least one of the sensed current conditions or the predictions). In this latter embodiment, the control signals generated by the EEPD may be embodied as result codes stored within memory 1940 for communication as data 1956 when requested. The external process then selects an icon associated with the retrieved control signal or result code. The external process then uses the I/O interface 1950 to display the selected icon(s). Each prediction timeframe may have its own control signal to support iconic representation of a plurality of prediction timeframes simultaneously as illustrated by displayed results 1982.

Displayed results 1982 may contain textual 1986 and iconic 1984 representations of various environmental elements for the point location. In one embodiment, data retrieved from the EEPD is used in conjunction with other geographic information such as map 1980 to map one or more environmental variables over a geographic region as indicated by map 1990.

The various methods described may be implemented using processor-executable instructions provided to a processor from a computer-readable tangible storage medium. Examples of storage mediums suitable for storing such processor-executable instructions include volatile storage mediums such as dynamic random access memory as well as nonvolatile storage mediums such as read only memories, optical disks, magnetic disks, and magnetic tape. Such a storage medium enables distribution and deployment of the various methods for client, server, broadcast transmitter, or broadcast receiver implementations as the case may be.

Although sophisticated methods for predicting environmental elements have been described, the EEPD is not limited to such methods. For example, the EEPD may predict an environmental element value using 1) one or more scatter points (i.e., non-grid data); 2) one or more grid points; or 3) some combination of grid and scatter points. The EEPD may interpolate values from any number of points to arrive at a prediction for the point of interest. The interpolation may be performed using linear, logarithmic, or other weighting schemes such as those previously set forth. The EEPD may but is not required to perform a correction to account for prediction errors as previously set forth.

In the preceding detailed description, the invention is described with reference to specific exemplary embodiments thereof. Methods and apparatus for predicting environmental elements have been described. Various modifications and changes may be made thereto without departing from the broader spirit and scope of the invention as set forth in the claims. The specification and drawings are, accordingly, to be regarded in an illustrative rather than a restrictive sense.

What is claimed is:

1. An irrigation control apparatus comprising:
    a receiver collecting broadcast environmental element prediction data associated with at least one point location as received data;
    a processor processing the received data to generate at least one environmental element prediction for a point of interest, wherein the point of interest is distinct from any point location of the received data, wherein the receiver and the processor are located at the point of interest, wherein the processor generates a first control signal based upon the at least one environmental element prediction; and
    a controller for controlling irrigation, the controller responsive at least in part to the first control signal.

2. The apparatus of claim 1 wherein the controller varies an irrigation schedule responsive to the first control signal.

3. The apparatus of claim 1 wherein the controller varies an amount of irrigation responsive to the first control signal.

4. The apparatus of claim 1 further comprising a locator for specifying the point of interest.

5. The apparatus of claim 1 wherein the locator determines the point of interest through satellite trilateration.

6. The apparatus of claim 1 wherein the environmental element prediction data is broadcast at least in part by satellite.

7. The apparatus of claim 1 wherein the environmental element prediction data comprises grid data.

8. The apparatus of claim 1 wherein the environmental element prediction data comprises scatter data.

9. The apparatus of claim 1 wherein the environmental element prediction data comprises grid data and scatter data.

10. The apparatus of claim 1 wherein the environmental element prediction is for at least one element from the set including {air temperature, pressure, wind speed, wind direction, probability of precipitation, amount of precipitation, humidity, cloud cover, visibility, water temperature, wave height, wave direction, heat index, wind chill, drought index, soil moisture, ultraviolet radiation, aerosol dispersion}.

* * * * *